US009840243B2

(12) United States Patent
Saito

(10) Patent No.: US 9,840,243 B2
(45) Date of Patent: Dec. 12, 2017

(54) BRAKE DEVICE

(71) Applicant: Hitachi Automotive Systems, Ltd., Hitachinaka-shi, Ibaraki (JP)

(72) Inventor: Masayuki Saito, Machida (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 14 days.

(21) Appl. No.: 14/917,646

(22) PCT Filed: Sep. 11, 2014

(86) PCT No.: PCT/JP2014/074020
§ 371 (c)(1),
(2) Date: Mar. 9, 2016

(87) PCT Pub. No.: WO2015/041124
PCT Pub. Date: Mar. 26, 2015

(65) Prior Publication Data
US 2016/0221557 A1    Aug. 4, 2016

(30) Foreign Application Priority Data
Sep. 19, 2013 (JP) .................................. 2013-193871

(51) Int. Cl.
*B60T 11/18*      (2006.01)
*B60T 7/06*       (2006.01)
(Continued)

(52) U.S. Cl.
CPC ................. *B60T 11/18* (2013.01); *B60T 7/06* (2013.01); *G05G 7/04* (2013.01); *G05G 1/44* (2013.01)

(58) Field of Classification Search
CPC .. B60T 11/18; B60T 7/06; G05G 1/44; G05G 1/46; G05G 7/04
See application file for complete search history.

(56) References Cited

U.S. PATENT DOCUMENTS

| 6,918,318 B2 * | 7/2005 | Willemsen ................ B60T 7/06 74/512 |
| 7,584,683 B2 * | 9/2009 | Fujiwara ................... B60T 7/06 74/516 |

(Continued)

FOREIGN PATENT DOCUMENTS

| CN | 101085614 A | 12/2007 |
| DE | 10 2011 004 041 A1 | 8/2012 |

(Continued)

OTHER PUBLICATIONS

International Search Report (PCT/ISA/210) issued in PCT Application No. PCT/JP2014/074020 dated Dec. 16, 2014 with English translation (Four (4) pages).

(Continued)

*Primary Examiner* — Thomas C Diaz
(74) *Attorney, Agent, or Firm* — Crowell & Moring LLP

(57) ABSTRACT

Provided is a brake device which improves energy efficiency. The brake device includes a stroke length adjusting unit configured to adjust rod stroke $S_R$ (stroke length of a piston in a master cylinder) relative to pedal stroke $S_P$ (quantity of operation of brake pedal by the driver).

17 Claims, 7 Drawing Sheets

(51) Int. Cl.
*G05G 7/04* (2006.01)
*G05G 1/44* (2008.04)

(56) References Cited

U.S. PATENT DOCUMENTS

2007/0277640 A1  12/2007  Fukase
2008/0001473 A1   1/2008  Mizutani et al.

FOREIGN PATENT DOCUMENTS

| JP | 51-45729     | 4/1976  |
| JP | 54-8242      | 1/1979  |
| JP | 2005-329872 A | 12/2005 |
| JP | 2008-6893 A  | 1/2008  |

OTHER PUBLICATIONS

Japanese-language Written Opinion (PCT/ISA/237) issued in PCT Application No. PCT/JP2014/074020 dated Dec. 16, 2014 (Three (3) pages).

* cited by examiner

BRAKE DEVICE

FIELD OF INVENTION

The invention relates to a brake device installed in a vehicle.

BACKGROUND ART

A well-known brake device is the one with a booster which generates an assisting force for reducing a brake pedal applying force applied by a driver. The brake device disclosed, for example, in a Patent Document 1 generates an assisting force by using a hydraulic booster which is supplied with brake fluid from a hydraulic power source (accumulator).

CITATION LIST

Patent Document

Patent Document 1: Japanese Unexamined Patent Application Publication No. 2008-6893

SUMMARY OF INVENTION

Technical Problem

Conventional technology has difficulty in enhancing energy efficiency. It is an object of the invention to provide a brake device capable of enhancing energy efficiency.

Solution to Problem

To achieve the object, the brake device of the present invention includes a stroke length adjusting unit configured to adjust the stroke length of a piston in a master cylinder, relative to the quantity of brake pedal operation by a driver.

Advantageous Effect of Invention

The invention thus enhances energy efficiency.

BRIEF DESCRIPTIONS OF DRAWINGS

FIG. 1 is a perspective view of a brake pedal 2 and a stroke length adjusting unit 3 according to Embodiment 1 (with an elastic member 6 and the like omitted from the figure).

FIG. 2 is a perspective view of the brake pedal 2 and the stroke length adjusting unit 3 according to Embodiment 1 (with the elastic member 6 and the like omitted from the figure).

FIG. 3 is a perspective view of a second link 32 according to Embodiment 1.

FIG. 4 is a perspective view of the brake pedal 2 and the stroke length adjusting unit 3 according to Embodiment 1 (with the elastic member 6 and the like illustrated).

DESCRIPTION OF EMBODIMENTS

An aspect for implementing a brake device of the present invention will be now described with reference to an embodiment based on the drawings.

[Embodiment 1]

The description will first explain a configuration of the brake device. The brake device of the present embodiment is applied to a hydraulic brake system which imparts a brake hydraulic pressure to each wheel of a vehicle to generate a braking force. The vehicle, for example, is an electric vehicle, such as a hybrid vehicle whose wheel-driving motor is not only an engine but also an electric motor (generator), and an electric automobile whose wheel-driving motor is solely an electric motor (generator). The vehicle may be a non-electric vehicle whose only driving motor is an engine. The brake system includes a brake device capable of generating hydraulic pressure (master-cylinder pressure) in a master cylinder in conjunction with a brake pedal 2, and a hydraulic pressure control unit capable of generating hydraulic pressure in a wheel cylinder (caliper) independently of the brake device.

Figure 1:
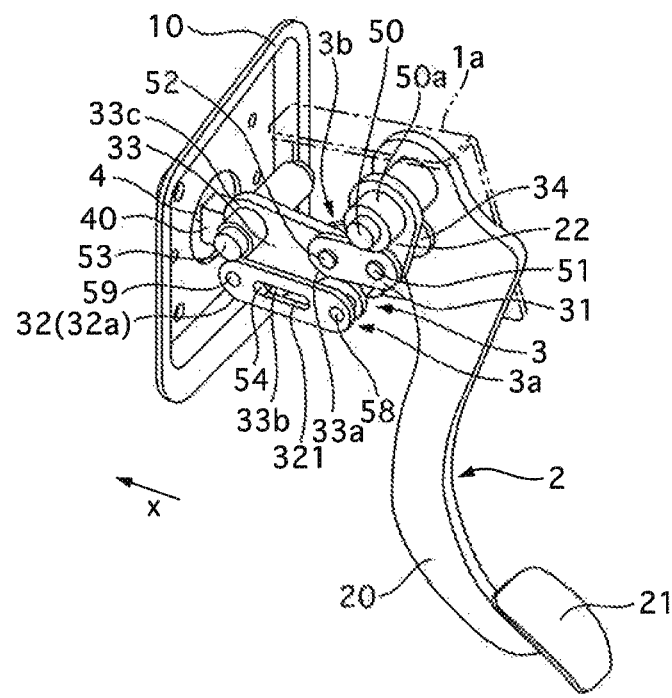
Figure 2:
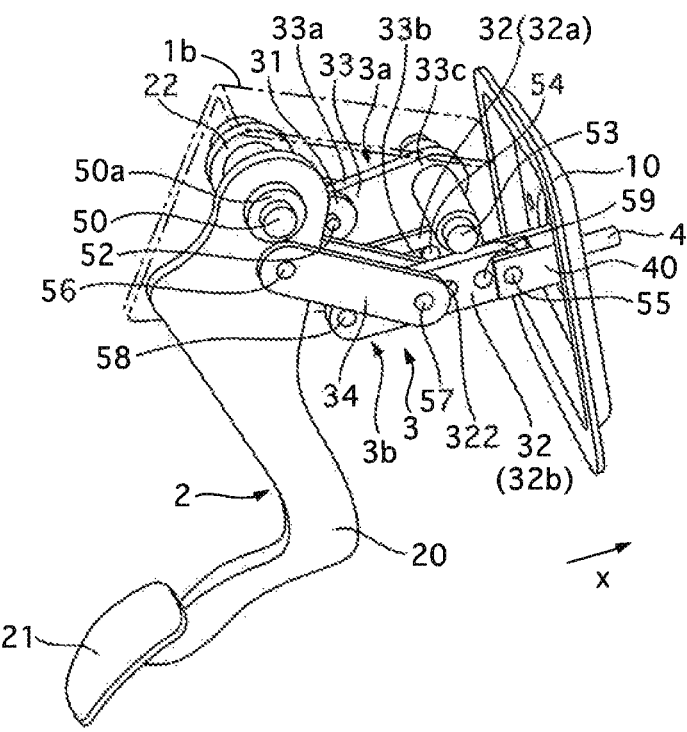
Figure 3:
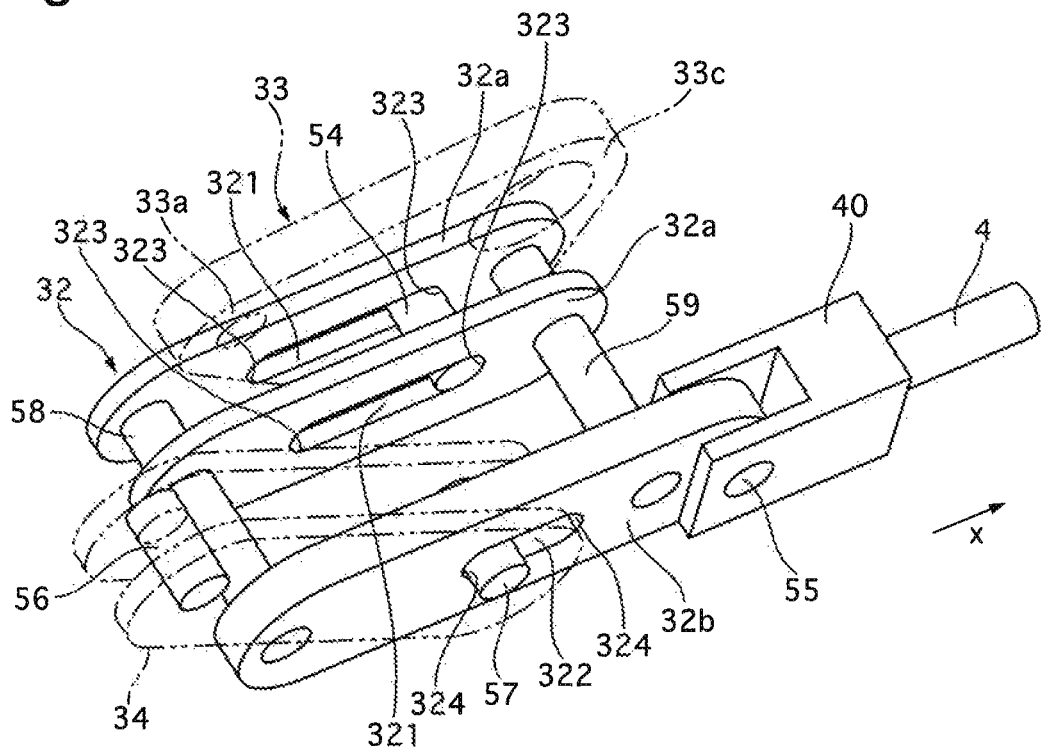
Figure 4:
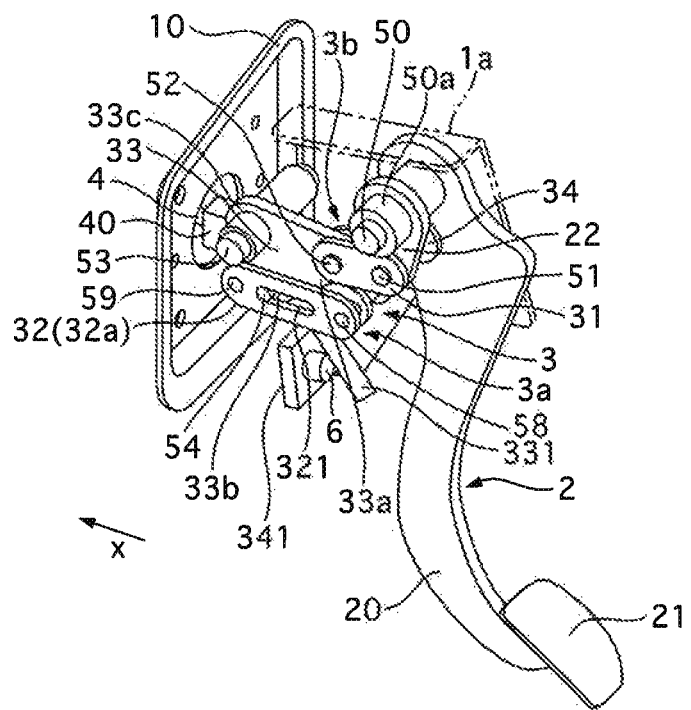

The brake device includes a stroke length adjusting unit 3 which adjusts a stroke length of a pushrod 4 (rod stroke $S_R$) relative to a quantity of operation by a driver on the brake pedal 2 (pedal stroke $S_P$). FIG. 1 is a perspective view of the brake pedal 2 and the stroke length adjusting unit 3 viewed from one of horizontal directions of the vehicle (hereinafter, referred to simply as "horizontal direction"). FIG. 2 is a perspective view viewed from the opposite horizontal direction. A later-mentioned elastic member 6 and the like are omitted from FIGS. 1 and 2. FIG. 3 is a perspective view of a second link 32 of the stroke length adjusting unit 3. FIG. 4 is a perspective view similar to FIG. 1, which shows an aspect in which a first intermediate link 33 of the stroke length adjusting unit 3 is provided with a rod portion 331, and a second intermediate link 34 of the stroke length adjusting unit 3 is provided with a retainer portion 341 and the elastic member 6.

The brake pedal 2 is a brake operation member in which the brake pedal operation by the driver is entered. The brake pedal operation entered in the brake pedal 2 (pedal stroke $S_P$ or pedal effort $F_P$) is transmitted through the stroke length adjusting unit 3 to the pushrod 4 and generates an axial motion of the pushrod 4 (rod stroke $S_R$) or axial thrust force of the pushrod 4 (rod thrust force $F_R$). The pushrod 4 is coupled to a piston in the master cylinder. The rod stroke $S_R$ or the rod thrust force $F_R$ is converted to a stroke or thrust force of the piston to generate master-cylinder pressure. Hereinafter, for the sake of explanation, an axial direction of the pushrod 4 is referred to as x-axis, and a direction in which the pushrod 4 strokes (is displaced) according to the pressing of the brake pedal 2 is referred to as positive.

The brake pedal 2 includes a pedal arm 20 extending in a vertical direction of the vehicle while curving with convex toward the x-axis positive direction, and a pedal pad 21 disposed at a lower end of the pedal arm 20. The brake pedal 2 is swingably supported by a bracket 1 which is fixed to a vehicle body side. The bracket 1 includes two bracket members 1a and 1b opposing in the horizontal direction. The bracket members 1a and 1b are combined together to form the bracket 1 in the shape of an inverted "U" as viewed in the x-axis direction. FIG. 1 shows only the bracket member 1a by a broken line, and FIG. 2 shows only the bracket member 1b also by a broken line. The bracket 1 is bolted to an x-axis negative direction side of a bottom of a mounting wall member 10 shaped like a dish with a bottom. The mounting wall member 10 is fixed to a lower portion of a dash panel so that the side on which the bracket 1 is attached faces an interior of the vehicle (in the x-axis negative direction), to thereby form a part of the dash panel. The dash panel is a partition wall member located on the vehicle body side, which partitions an engine room or motor room (in which a power unit is installed) (hereinafter, referred to simply as "engine room") from the vehicle interior. The bracket 1 is thus fixed to protrude toward the vehicle interior. Between the bracket members 1a and 1b, a pedal rotating shaft 50 is disposed to extend in the horizontal direction. The pedal rotating shaft 50 is fixed to the bracket 1.

The brake pedal 2 is of a so-called hanging type. The pedal arm 20 has an upper end portion which is rotatably coupled to the pedal rotating shaft 50. The brake pedal 2 is thus supported by the bracket 1 to be rotatable around the pedal rotating shaft 50. When the driver steps on the pedal pad 21 located at the lower end of the brake pedal 2, and the brake pedal 2 receives an operation force (pedal effort $F_P$), the brake pedal 2 pivots around the pedal rotating shaft 50 in a forward direction of the vehicle (x-axis positive direction). A cylindrical rotary member 50a is wrapped around an outer periphery of the pedal rotating shaft 50 to be rotatable around the pedal rotating shaft 50. The brake pedal 2 has an upper end portion which is fixed to the rotary member 50a and therefore rotatable around the pedal rotating shaft 50. Fixed to the rotary member 50a is an upper end of a plate-like arm member 22. The upper end of the arm member 22 is located adjacent to the upper end portion of the brake pedal 2 in the horizontal direction. The brake pedal 2 and the arm member 22 rotate around the pedal rotating shaft 50 in the same rotational phase (at the same rotation angle). In this respect, the brake pedal 2 and the arm member 22 can be considered as an integral member.

The stroke adjusting unit 3 is a link-type booster formed by combining a variable link mechanism 3a and a fixed link mechanism 3b. In the variable link mechanism 3a, a ratio (stroke or lever ratio) of an axial motion amount of the pushrod 4 (rod stroke $S_R$) to a rotating directional motion amount of the brake pedal 2 (pedal stroke $S_P$), is variable. In the fixed link mechanism 3b, the above ratio is fixed. The stroke length adjusting unit 3 connects the brake pedal 2 and the pushrod 4 to each other. The stroke length adjusting unit 3 amplifies a force created by the driver operating the brake pedal 2, and then transmits the amplified force to the pushrod 4. The brake device uses the stroke length adjusting unit 3 to exert a boosting function that generates a hydraulic braking force which cannot be sufficiently generated by the brake pedal applying force applied by the driver, and thus assists the brake pedal operation. Specifically, the brake device of the present embodiment does not include a booster which boosts or amplifies the force applied to the brake pedal 2 by using an energy source other than the brake pedal applying force applied by the driver, which includes a manifold pressure (negative pressure) generated by a vehicle engine, an electric motor, etc. Instead, the brake device is configured to be capable of assisting the brake pedal applying force by actuating the stroke length adjusting unit 3 according to the operation of the brake pedal 2.

The pushrod 4 is a brake pedal applying force transmission member which transmits the brake pedal applying force applied by the driver, which is entered in the brake pedal 2 (amplified by the stroke length adjusting unit 3), to the master cylinder as a thrust force (rod thrust force $F_R$) acting in the x-axis direction. The pushrod 4 operates in the x-axis direction in conjunction with the brake pedal 2 (stroke length adjusting unit 3). When receiving input from the second link 32 which is an output member of the stroke length adjusting unit 3 and an output link member of the link mechanisms 3a and 3b, the pushrod 4 strokes in the x-axis positive direction according to the pressing of the brake pedal 2. The pushrod 4 is an input member (input rod) of the master cylinder, and has an x-axis positive direction end which is connected to the piston (primary piston) of the master cylinder.

The master cylinder is connected to the stroke length adjusting unit 3 via the pushrod 4. The master cylinder includes an integral reservoir (tank) functioning as a brake fluid source for containing brake fluid. The master cylinder is supplied with the brake fluid from the reservoir. The master cylinder is connected to a wheel cylinder (caliper) of a predetermined wheel of the vehicle through an oil passage (brake pipe). The master cylinder is a first brake hydraulic pressure generation source which generates a hydraulic pressure (master-cylinder pressure) according to the driver's operation of the brake pedal 2 (brake pedal operation). The master-cylinder pressure is supplied through the oil passage to the wheel cylinder and generates a wheel-cylinder hydraulic pressure (brake hydraulic pressure). The master cylinder is of a so-called tandem-type. The master cylinder includes a bottomed cylinder whose x-axis positive direction side is closed, and whose x-axis negative direction side is open, and two pistons inserted in the cylinder so as to be slidable on an inner peripheral surface of the cylinder. Defined inside the cylinder by the pistons are a primary P-system hydraulic chamber and a secondary S-system hydraulic chamber. The hydraulic chambers are respectively connected to the hydraulic pressure control unit and allowed to come into communication with a predetermined wheel cylinder.

The cylinder is bolted to an x-axis positive direction side of the bottom of the mounting wall member 10. The master cylinder is thus fixed to protrude toward the engine room (in the x-axis positive direction). The x-axis positive direction end of the pushrod 4 penetrating the mounting wall member 10 is pivotally connected to an x-axis negative direction end of the primary piston of the P system. The secondary piston of the S system is a free piston and disposed on the x-axis positive direction side of the primary piston. The P-system hydraulic chamber is defined between the pistons, and the S-system hydraulic chamber is defined between the secondary piston and a bottom of the cylinder. The thrust force of the pushrod 4, which acts in the x-axis positive direction, is transmitted to the primary piston by the brake pedal operation by the driver. The hydraulic chambers decrease in volume as the primary piston strokes in the x-axis positive direction. This supplies the brake fluid from the hydraulic chambers toward the wheel cylinder, and generates generally the same hydraulic pressure (master-cylinder pressure) in the hydraulic chambers. In each of the hydraulic chambers, a coil spring is disposed in a compressed position. The coil spring functions as a pull-back spring of the corresponding piston and as a reaction-force imparting device capable of imparting a proper reaction force to the brake pedal 2.

The hydraulic pressure control unit is a second brake hydraulic pressure generation source capable of generating the brake hydraulic pressure, independently of the brake pedal operation by the driver by being supplied with brake fluid from the master cylinder (reservoir). The hydraulic pressure control unit is connected to the wheel cylinder of each wheel and the master cylinder through brake pipes. The hydraulic pressure control unit is capable of supplying the master-cylinder pressure or control hydraulic pressure to the wheel cylinders individually. The hydraulic pressure control unit includes a pump functioning as a hydraulic pressure generation source, and a plurality of control valves (electromagnetic valves) for switching communication conditions of the oil passage formed in a housing, as hydraulic devices (actuators) for generating the control hydraulic pressure. The hydraulic pressure control unit includes a hydraulic pressure sensor which detects hydraulic pressure (master-cylinder pressure, etc.) at a predetermined point of the oil passage. A value detected by the hydraulic pressure sensor is input to an electronic control unit ECU. The ECU, on the basis of each piece of information put thereto, controls operations of the actuators of the hydraulic pressure control unit according to a stored program, thereby being capable of controlling (boosting, reducing and maintaining) hydraulic pressures of the wheel cylinders, independently of the brake pedal operation by the driver. The ECU is capable of implementing antilock brake control (ABS) which reduces a locking tendency of the wheels, and brake control (vehicle behavior control, such as VDC and ESC) which suppresses the vehicle from skidding and the like to stabilize vehicle behavior, by using the hydraulic pressure control unit.

When each of the actuators of the hydraulic pressure control unit is not in operation, the hydraulic chambers of the master cylinder and the predetermined wheel cylinder are in communication with each other. At this time, the master-cylinder pressure generated using the brake pedal applying force applied to the brake pedal 2 by the driver (pedal effort $F_P$) is used to generate a wheel-cylinder hydraulic pressure (hereinafter, referred to as "pedal effort braking"). When regular braking is performed, in which a hydraulic pressure braking force is generated according to the brake pedal operation by the driver, the brake device turns off the pump, the electromagnetic valves, and the like, and brings the hydraulic pressure control unit into an inactive state, in all ranges of the pedal stroke $S_P$ (that is, each hydraulic pressure range in each step of the braking, including a low pressure range at an initial stage of the braking after the brake pedal operation is initiated), to thereby implement the pedal effort braking. At this time, the stroke length adjusting unit 3 makes it possible to achieve predetermined pedal characteristics, that is, desired relationship characteristics between the quantity of the brake pedal operation by the driver (pedal stroke $S_P$), the brake pedal applying force (pedal effort $F_P$), and the wheel-cylinder hydraulic pressure P (vehicle deceleration G). Assuming, for example, that there is a brake device (hereinafter, referred to as "comparative example") which includes a regular-sized engine negative-pressure booster which boosts a brake pedal operation force by using a negative pressure generated by a vehicle engine and does not include the stroke length adjusting unit 3, the present embodiment defines that the desired relationship characteristics described above are pedal characteristics achieved during operation of the engine negative-pressure booster in the above-described comparative example.

A structure of the stroke length adjusting unit 3 will be now described. The link mechanisms 3a and 3b of the stroke length adjusting unit 3 include a plurality of plate-like link members, and include a first link 31, a second link 32, a first intermediate link 33, and a second intermediate link 34. As shown in FIGS. 1 and 2, the first link 31 has a shape like a bar in a side view (as viewed in the horizontal direction). The first link 31 has one end side (x-axis negative direction side) pivotally connected to the brake pedal 2 and the other end side (x-axis positive direction side) pivotally connected to the first intermediate link 33. To be specific, the one end side (x-axis negative direction side) of the first link 31 is rotatably coupled to a lower end side of the arm member 22 with a pin 51 which functions as a shaft member extending in the horizontal direction. The other end side (x-axis positive direction side) of the first link 31 is rotatably coupled to the one end side (x-axis negative direction side) of the first intermediate link 33 with a pin 52 extending in the horizontal direction. The first link 31 is formed of two homological plate-like members and coupled to the arm member 22 and the first intermediate link 33 so that the plate-like members sandwich the arm member 22 and the first intermediate link 33 therebetween in the horizontal direction.

Figure 5:
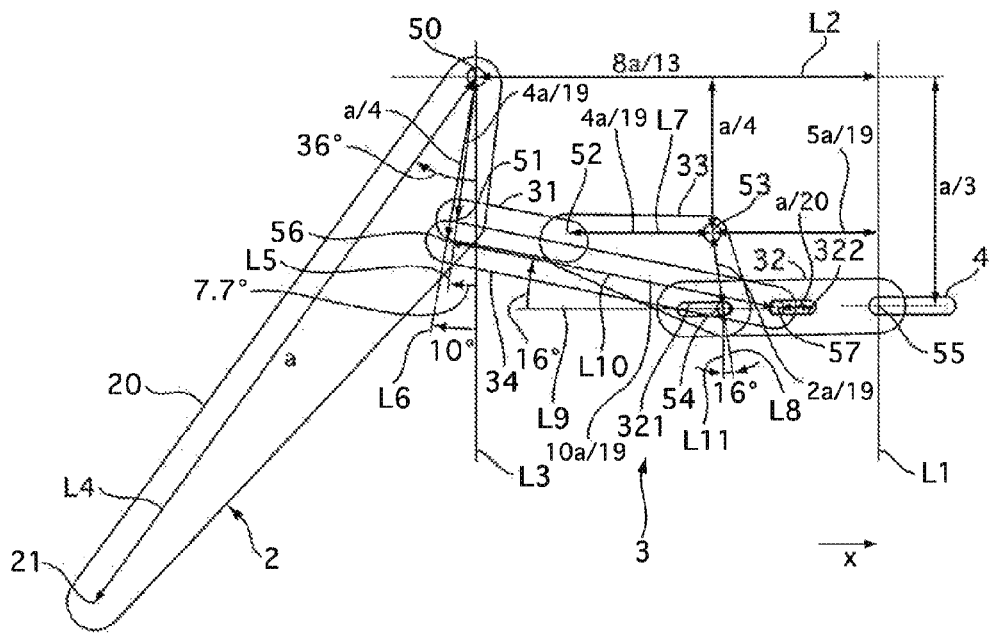
FIG. 5 is a diagram of the brake pedal 2 and the stroke length adjusting unit 3 in an initial state according to Embodiment 1, showing geometric dimensions.

As shown in FIGS. 1 to 5, the second link 32 has a shape like a bar in a side view. The second link 32 has one end side (x-axis positive direction side) pivotally connected to the pushrod 4 with a device 40. In the other end side (x-axis negative direction side) of the second link 32, a first slotted hole 321 is formed to extend in a longitudinal direction of the second link 32. The first slotted hole 321 is a first slide portion formed along an axial direction of the second link 32. As shown in FIG. 5, a second slotted hole 322 is formed between the one end side (x-axis positive direction side) of the second link 32 and the first slotted hole 321 to extend along the longitudinal direction of the second link 32 (FIG. 3 shows an alternative aspect in which the first and second slotted holes 321 and 322 partially overlap with each other along the x-axis). The second slotted hole 322 is a second slide portion which is formed along the axial direction of the second link 32. The second link 32, more concretely, is formed of a first link portion 32a and a second link portion 32b. The second link portion 32b is formed of a single plate-like member and has one end side (x-axis positive direction side) rotatably coupled to the device 40 in a forked shape by using a pin 55 extending in the horizontal direction. In a generally intermediate position between the one end side and the other end side (x-axis negative direction side) of the second link portion 32b, the second slotted hole 322 extends along a longitudinal direction of the second link portion 32b and is formed through the second link portion 32b in the horizontal direction.

The first link portion 32a is formed of two homological plate-like members. The plate-like members are disposed in parallel in the horizontal direction with a gap left therebetween. The first link portion 32a formed of the plate-like members is disposed in parallel with the second link portion 32*b* in the horizontal direction with a gap left therebetween. The first link portion 32*a* has such a shape that the outline thereof is located generally within the outline of the second link portion 32*b* as viewed in the horizontal direction. One end side (x-axis positive direction side) of the first link portion 32*a* is fixed to the one end side (between the coupling pin 55 of the device 40 and the second slotted hole 322) of the second link portion 32*b* through a fixed shaft 59 extending in the horizontal direction. The other end side (x-axis negative direction side) of the first link portion 32*a* is fixed to the other end side of the second link portion 32*b* through a fixed shaft 58 extending in the horizontal direction. In a generally intermediate position between both the ends of the first link portion 32*a*, the first slotted hole 321 is formed to extend along the longitudinal direction of the first link portion 32*a* and penetrate the first link portion 32*a* in the horizontal direction. The first slotted hole 321 is longer in the axial direction than the second slotted hole 322. One end side (x-axis positive direction side) of the first slotted hole 321 is located in generally the same axial position as one end side (x-axis positive direction side) of the second slotted hole 322, whereas the other end side (x-axis negative direction side) of the first slotted hole 321 is located closer to the other end side (x-axis negative direction side) than the other end side (x-axis negative direction side) of the second slotted hole 322.

As shown in FIGS. 1 and 2, the first intermediate link 33 has a triangular shape in a side view. One end side (first corner 33*a* located at the x-axis negative direction side and upper side) of the first intermediate link 33 is pivotally connected to the other end side (x-axis positive direction side) of the first link 31. The other end side (second corner 33*b* located at the x-axis positive direction side and lower side) of the first intermediate link 33 is slidably (movably along the first slotted hole 321) engaged with the first slotted hole 321 of the second link 32. The first intermediate link 33 is swingably connected to the bracket 1 in a portion (third corner 33*c* located at the x-axis positive direction side and upper side) between both the ends thereof. More concretely, the first corner 33*a* of the first intermediate link 33 is rotatably coupled to the other end side (x-axis positive direction side) of the first link 31 with the pin 52. Fixed to the second corner 33*b* is a first engagement pin 54 extending in the horizontal direction. The first engagement pin 54 is fitted in the first slotted hole 321 of the second link 32 (two plate-like members of the first link portion 32*a*) with allowance (in an axially movable manner relative to the first slotted hole 321). The first engagement pin 54 is allowed to come into contact with and then engagement with each axial end portion of the first slotted hole 321 in the axial direction. The second corner 33*b* is sandwiched between the two plate-like members of the first link portion 32*a* and slidably engaged with the first slotted hole 321 (first link portion 32*a*) through the first engagement pin 54. A first intermediate link rotating shaft 53 is disposed in the bracket 1 (between the bracket members 1*a* and 1*b*) to be located further on the x-axis positive direction side and at a lower position than the pedal rotating shaft 50 to extend in the horizontal direction. The third corner 33*c* is rotatably coupled to the first intermediate link rotating shaft 53. The first intermediate link 33 is supported by the bracket 1 to be rotatable around the first intermediate link rotating shaft 53.

As shown in FIG. 2, the second intermediate link 34 has a bar-like shape in a side view. The second intermediate link 34 has one end side (x-axis negative direction side) which is pivotally connected to the brake pedal 2. The other end side (x-axis positive direction side) of the second intermediate link 34 is engaged with the second slotted hole 322 of the second link 32 in a slidable manner (to be movable along the second slotted hole 322). Specifically, the one end side (x-axis negative direction side) of the second intermediate link 34 is rotatably coupled to an upper end side of the pedal arm 20 (lower side of the pedal rotating shaft 50) with a pin 56 extending in the horizontal direction.

Fixed to the other end side (x-axis positive direction side) of the second intermediate link 34 is a second engagement pin 57 extending in the horizontal direction. The second engagement pin 57 is fitted in the second slotted hole 322 of the second link 32 (second link portion 32*b*) with allowance (in an axially movable manner relative to the second slotted hole 322). The second engagement pin 57 is capable of coming into contact with and then engagement with each axial end portion of the second slotted hole 322 in the axial direction. The second intermediate link 34 is formed of two homological plate-like members. The second intermediate link 34 holds the pedal arm 20 at the one end side from the horizontal directions and is coupled to the pedal arm 20. Also, the second intermediate link 34 holds the second link 32 (second link portion 32*b*) at the other end side from the horizontal directions to be slidably engaged with the second slotted hole 322 (second link portion 32*b*) through the second engagement pin 57.

As shown in FIG. 3, the slotted holes 321 and 322 of the second link 32 are so designed that dimensions perpendicular to the axis (widthwise sizes in a short-length direction) are slightly larger than a diameter of each of the engagement pins 54 and 57. Both axial end portions of each of the slotted holes 321 and 322 are formed in a shape curved along outer peripheries of the engagement pins 54 and 57, respectively. In inner peripheries of the axial end portions of the first slotted hole 321, there are disposed rubber films 323. The rubber films 323 are first shock-absorbing members disposed to be contactable to the first engagement pin 54. Likewise, rubber films 324 are disposed in inner peripheries of the axial end portions of the second slotted hole 322 of the second link 32. The films 324 are second shock-absorbing members disposed to be contactable to the second engagement pin 57.

As shown in FIG. 4, the first intermediate link 33 is provided with a rod portion 331 for contacting the elastic member 6. The rod portion 331 is formed integrally with the second corner 33*b* or integrally fixed to the second corner 33*b* so as to extend downward from a lower side and the x-axis positive direction side (second corner 33*b*) of the first intermediate link 33. The second intermediate link 34 is provided with the elastic member (elastic element) 6. In particular, the retainer portion 341 for holding the elastic member 6 is disposed in the lower side and x-axis positive direction side of the second intermediate link 34. The retainer portion 341 is formed integrally with the second intermediate link 34 or integrally fixed to the second intermediate link 34. The retainer portion 341 includes a face expanding in the horizontal and vertical directions. The retainer portion 341 is so disposed that the x-axis negative direction side face is opposed to the rod portion 331. The elastic member 6 is disposed in the retainer portion 341 to be located in a portion (x-axis negative direction side face) opposed to the rod portion 331. The elastic member 6 is, for example, a rubber columnar member and disposed to be elastically deformable at least in the axial direction. The elastic member 6 generates a reaction force by being compressed. The elastic member 6 is so disposed that an axis thereof is positioned within a plane on which the rod portion 331 pivots and that an axial end face thereof is opposed to an x-axis positive direction side face (face to come into contact with the elastic member 6) of the rod portion 331.

FIG. 5 is a side view schematically showing the brake pedal 2, the stroke length adjusting unit 3, and the pushrod 4 in an initial state (initial attitude) where the brake pedal operation by the driver is not performed. The rod portion 331, the retainer portion 341, and the elastic member 6 are omitted from FIG. 5. L1 is a virtual vertical line extending through a pivot center (pin 55) of the second link 32 which pivots relative to the pushrod 4 (device 40). L2 is a horizontal line extending through a fulcrum of the brake pedal 2, namely, a swing center (pedal rotating shaft 50) of the brake pedal 2 which swings relative to the bracket 1. L3 is a vertical line extending through the pedal rotating shaft 50. L4 is a half line extending from the pedal rotating shaft 50 through a point of effort (pedal pad 21) of the brake pedal 2; L5 is a half line extending through a pivot center (pin 51) of the one end side (x-axis negative direction side) of the first link 31 which pivots relative to the arm member 22 (brake pedal 2); and L6 is a half line extending through a pivot center (pin 56) of the one end side (x-axis negative direction side) of the second intermediate link 34 which pivots relative to the brake pedal 2. L7 is a half line extending, from a swing center (first intermediate link rotating shaft 53) of the first intermediate link 33 which swings relative to the bracket 1, through a pivot center (pin 52) of the first intermediate link 33 which pivots relative to the other end side (x-axis positive direction side) of the first link 31. L8 is a half line extending through the first engagement pin 54 of the first intermediate link 33. L9 is a horizontal line extending through the second engagement pin 57 of the second intermediate link 34. L10 is a half line extending from the second engagement pin 57 through the pin 56. L11 is a vertical line extending through the first engagement pin 54.

If distance from the pedal rotating shaft 50 to the pedal pad 21 is a(>0), each dimension (geometry) in a side view as in FIG. 5 is set as described below in the initial state shown in FIG. 5. Distance from the pedal rotating shaft 50 to the vertical line L1 is 8a/13; distance from the pedal rotating shaft 50 to the pin 51 is 4a/19; and distance from the pedal rotating shaft 50 to the pin 56 is a/4. An angle between the half lines L3 and L4 is 36 degrees; an angle between the half lines L3 and L5 is 7.7 degrees; and an angle between the half lines L3 and L6 is 10 degrees. Distance from the pin 55 to the vertical line L2 is a/3. Distance from the first intermediate link rotating shaft 53 to the vertical line L1 is 5a/19; distance from the first intermediate link rotating shaft 53 to the horizontal line L2 is a/4; distance from the first intermediate link rotating shaft 53 to the pin 52 is 4a/19; and distance from the first intermediate link rotating shaft 53 to the first engagement pin 54 is 2a/19. The half line L7 is generally horizontal. Distance from the pin 56 to the second engagement pin 57 is 10a/19. An angle between the half lines L8 and L11 is 16 degrees. An angle between the half lines L9 and L10 is 16 degrees. Distance from the second engagement pin 57 to the x-axis positive direction end of the second slotted hole 322 is a/20.

[Operation]

An operation of the brake device will be now described (operation of the stroke length adjusting unit).

Figure 6:
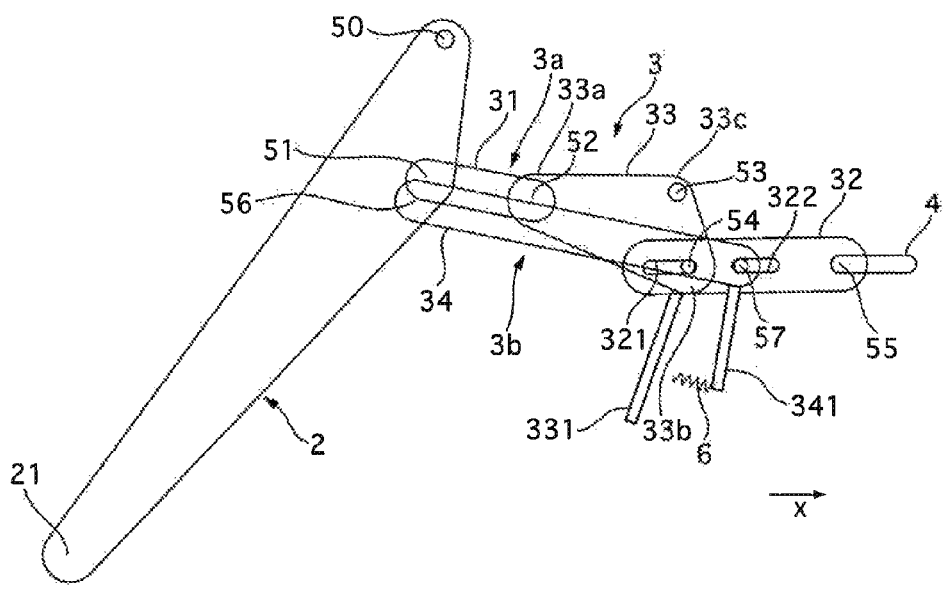
FIG. 6 is a diagram showing an operating condition of the stroke length adjusting unit 3 according to Embodiment 1 ($S_P=0$).

FIGS. 6 to 9 show an operating condition of the stroke length adjusting unit 3 in a schematic view as with FIG. 5. FIG. 6 shows a position (initial position) of each member in the initial state where the amount of pressing $S_P$ of the brake pedal 2 is zero. The first engagement pin 54 at the x-axis positive direction end side (second corner 33b) of the first intermediate link 33 is in contact with the x-axis positive direction end portion (film 323) of the first slotted hole 321 of the second link 32 (first link portion 32a). The first engagement pin 54 is engaged with the second link 32 at the x-axis positive direction side of the first slotted hole 321. The second engagement pin 57 at the x-axis positive direction end side of the second intermediate link 34 is engaged with the second link 32 at the x-axis positive direction side of the second slotted hole 322 while being fitted with allowance in the second slotted hole 322 (to be movable in the x-axis positive direction relative to the second slotted hole 322) at a position away in the x-axis negative direction from the x-axis positive direction end portion (film 324) of the second slotted hole 322 of the second link 32 (second link portion 32b). In other words, when the brake pedal 2 is activated, the x-axis positive direction side end (first engagement pin 54) of the first intermediate link 33 is engaged with the first slotted hole 321 without allowance, that is, with the first engagement pin 54 in contact with the x-axis positive direction end portion of the first slotted hole 321, and the x-axis positive direction side end (second engagement pin 57) of the second intermediate link 34 is engaged with the second slotted hole 322 with allowance, that is, with the second engagement pin 57 out of contact with the x-axis direction end portions of the second slotted hole 322. There is a gap between the rod portion 331 of the first intermediate link 33 and the elastic member 6 of the second intermediate link 34 as viewed in the axial direction. The rod portion 331 is therefore not in contact with the elastic member 6.

When the brake pedal 2 is pressed, the point of effort (pedal pad 21) and the points of load (pins 51 and 56) of the brake pedal 2 rotate around the fulcrum (pedal rotating shaft 50) anticlockwise as viewed in the figure. When the pedal stroke $S_P$ is in a range from zero to $S_P2$, the x-axis positive direction end side (first engagement pin 54) of the first intermediate link 33 is engaged with the x-axis positive direction end of the first slotted hole 321 of the second link 32 as described above, and the x-axis positive direction end side (second engagement pin 57) of the second intermediate link 34 is fitted with allowance in the second slotted hole 322 of the second link 32 as described above. At this time, a rotation force at the point of load (pin 51) is transmitted through the first link 31 to the first intermediate link 33 (pin 52), and causes the first intermediate link 33 to rotate around the fulcrum (first intermediate link rotating shaft 53) anticlockwise. The first engagement pin 54 is engaged with the first slotted hole 321 so as to be capable of transmitting a force to the second link 32. The rotation force of the first intermediate link 33 is therefore transmitted through the first engagement pin 54 to the second link 32. The rotation force is then transmitted through the second link 32 (pin 55) to the pushrod 4 to make the pushrod 4 move in the x-axis positive direction. The rotation force at the point of load (pin 56) is transmitted to the second intermediate link 34 to cause the second intermediate link 34 (second engagement pin 57) to move in the x-axis positive direction. Since the second engagement pin 57 is not engaged with the x-axis positive direction end of the second slotted hole 322, the force transmitted to the second intermediate link 34 is not transmitted to the second link 32 through the second engagement pin 57. When the pedal stroke $S_P$ is smaller than $S_P2$ as mentioned above, the rotation force of the brake pedal 2 (pedal effort $F_P$) is converted into a force acting along a line, which makes the pushrod 4 move in the x-axis positive direction, through the first link 31, the first intermediate link 33, and the second link 32. Due to the operation of the link mechanism 3a including the links 31, 32 and 33, a ratio $S_P/S_R$ of the pedal stroke $S_P$ and the rod stroke $S_R$ (hereinafter, referred to as "stroke ratio") is variable according to the pedal stroke $S_P$. That is, the first link 31, the first intermediate link 33, and the second link 32 form the variable link mechanism 3a.

Figure 7:
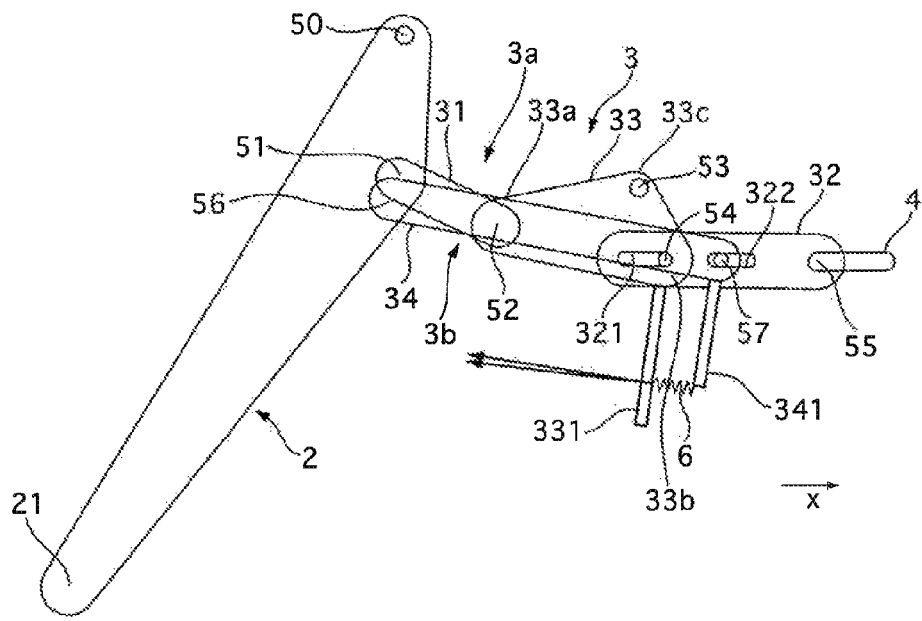
FIG. 7 is a diagram showing an operating condition of the stroke length adjusting unit 3 according to Embodiment 1 ($S_P1 \leq S_P \leq S_P2$).

When the pedal stroke $S_P$ reaches a value equal to or larger than $S_P1$ which is smaller than $S_P2$ ($<S_P2$), this clears the x-axial gap between the rod portion 331 of the first intermediate link 33 and the elastic member 6 of the second intermediate link 34, and causes the rod portion 331 to come into contact with the elastic member 6. FIG. 7 shows a position of each member in a condition where the pedal stroke $S_P$ is equal to or larger than $S_P1$ but smaller than $S_P2$. As described above, the rotation force at the point of load (pin 51) is transmitted through the first link 31 to the first intermediate link 33 (pin 52) and tries to make the first intermediate link 33 rotate around the fulcrum (first intermediate link rotating shaft 53) anticlockwise. At this time, the rod portion 331 compresses the elastic member 6 in the axial direction and receives a reaction force from the elastic member 6 according to a compression amount (see arrows in the figure). The reaction force entered in the rod portion 331 tries to make the first intermediate link 33 rotate around the fulcrum (first intermediate link rotating shaft 53) clockwise. This rotation force is transmitted through the first link 31 to the brake pedal 2.

Figure 8:
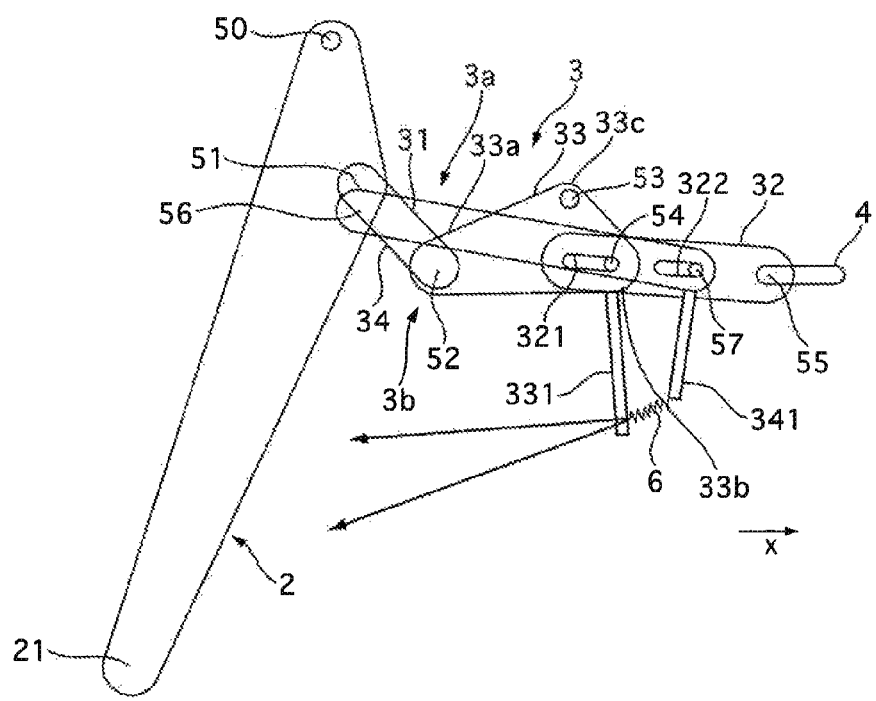
FIG. 8 is a diagram showing an operating condition of the stroke length adjusting unit 3 according to Embodiment 1 ($S_P=S_P2$).

FIG. 8 shows a position of each member when the pedal stroke $S_P$ reaches $S_P2$. If the pedal stroke $S_P$ becomes equal to or larger than $S_P2$, the first engagement pin 54 of the first intermediate link 33 moves away from the x-axis positive direction end portion of the first slotted hole 321 of the second link 32, and is thus disengaged from the second link 32 at the x-axis positive direction end of the first slotted hole 321 (becomes fitted with allowance in the first slotted hole 321). The second engagement pin 57 of the second intermediate link 34 comes into contact with the x-axis positive direction end portion (film 324) of the second slotted hole 322 of the second link 32, and is then engaged with the second link 32 at the x-axis positive direction end of the second slotted hole 322. At this time, the rotation force at the point of load (pin 56) is transmitted to the second intermediate link 34 and makes the second intermediate link 34 (second engagement pin 57) move in the x-axis positive direction as described above. The second engagement pin 57 at this time is engaged with the x-axis positive direction end of the second slotted hole 322. As the result, the force transmitted to the second intermediate link 34 is transmitted through the second engagement pin 57 to the second link 32, and then transmitted to the pushrod 4 through the second link 32 (pin 55) to cause the pushrod 4 to move in the x-axis positive direction. As mentioned above, the rotation force at the point of load (pin 51) is transmitted through the first link 31 to the first intermediate link 33 (pin 52), and makes the first intermediate link 33 rotate around the fulcrum (first intermediate link rotating shaft 53) anticlockwise. The first engagement pin 54 at this time is not engaged with the x-axis positive direction end of the first slotted hole 321, so that the rotation force of the first intermediate link 33 is not transmitted to the second link 32 through the first engagement pin 54. In this manner, when the pedal stroke $S_P$ is equal to or larger than $S_P2$, the rotation force of the brake pedal 2 (pedal effort $F_P$) is converted into a force acting along a line, which makes the pushrod 4 move in the x-axis positive direction, through the second intermediate link 34 and the second link 32. The link mechanism 3b formed of the links 32 and 34 is so configured that the stroke ratio $S_P/S_R$ remains fixed even if the pedal stroke $S_P$ changes. Namely, the second intermediate link 34 and the second link 32 form the fixed link mechanism 3b. In this way, when the pedal stroke $S_P$ is changed from a value smaller than $S_P2$ to a value equal to or larger than $S_P2$, the operation of the variable link mechanism 3a is terminated. Instead, the fixed link mechanism 3b is activated. That is, the fixed link mechanism 3b immediately takes over the operation of the variable link mechanism 3a. FIG. 8 shows a condition in which the first engagement pin 54 moves away from the x-axis positive direction end of the first slotted hole 321 (the operation of the variable link mechanism 3a is terminated), and the second engagement pin 57 is about to contact the x-axis positive direction end of the second slotted hole 322 (the fixed link mechanism 3b is about to be activated), that is, a condition in which the variable link mechanism 3a and the fixed link mechanism 3b are switched between each other.

Figures 9, 10:
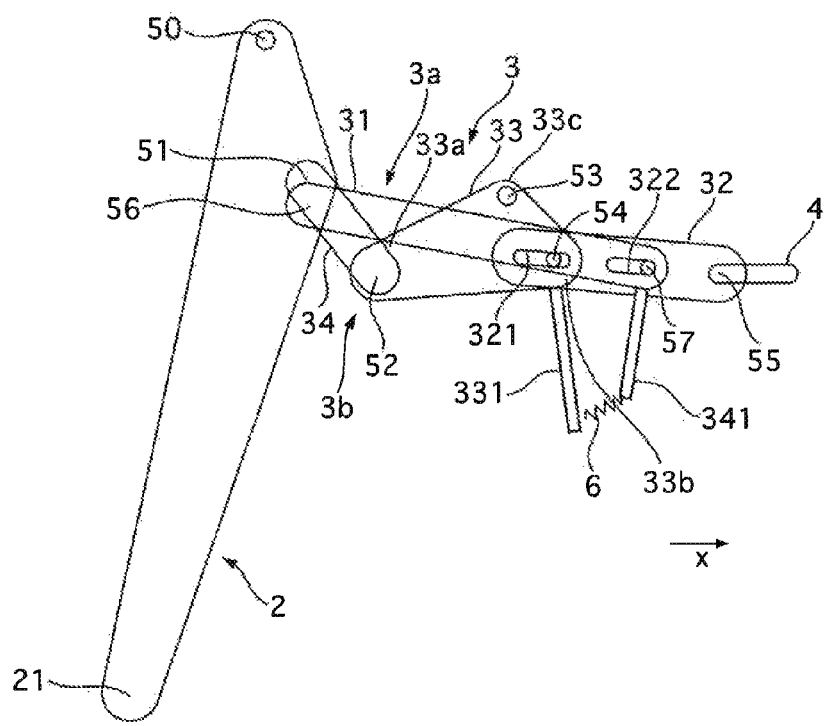
FIG. 9 is a diagram showing an operating condition of the stroke length adjusting unit 3 according to Embodiment 1 ($S_P \geq S_P3$).
FIG. 10 is a property chart showing relationship between pedal stroke $S_P$ and rod stroke $S_R$ according to Embodiment 1.

When the pedal stroke $S_P$ becomes equal to or larger than $S_P2$, and the variable link mechanism 3a is switched to the fixed link mechanism 3b, the elastic member 6 that has been compressed pushes the second intermediate link 34 toward the pushrod 4 in order to return to an original form thereof. In other words, the reaction force resulting from the compressive deformation of the elastic member 6 is transmitted from the rod portion 331 of the first intermediate link 33 to the retainer portion 341 of the second intermediate link 34. This reaction force acts to propel the second intermediate link 34 toward the pushrod 4 (x-axis positive direction side). FIG. 9 shows a position of each member when the pedal stroke $S_P$ is a value equal to or larger than $S_P3$ which is larger than $S_P2$ ($>S_P2$). When the pedal stroke $S_P$ becomes equal to or larger than $S_P3$, the x-axial gap is created again between the rod portion 331 and the elastic member 6, which makes the rod portion 331 come out of contact with the elastic member 6 (the elastic member 6 moves away from the rod portion 331). That is to say, the first and second intermediate links 33 and 34 contact each other with the elastic member 6 intervening therebetween when the pedal stroke is in the vicinity of $S_P2$ ($S_P1 \leq S_P \leq S_P3$).

FIGS. 10 to 14 show pedal characteristics of the brake device with various parameters. Solid lines in the figures indicate characteristics achieved by the stroke length adjusting unit 3 (in which the variable and fixed link mechanisms 3a and 3b are switched between each other to operate by rotation). Dot-and-dash lines indicate characteristics seen in a case where the stroke length adjusting unit 3 operates only as the variable link mechanism 3a (where the variable link mechanism 3a, instead of the fixed link mechanism 3b, operates even if the pedal stroke $S_P$ becomes equal to or larger than $S_P2$). Double-dot-and-dash lines indicate characteristics seen in a case where the stroke length adjusting unit 3 operates only as the fixed link mechanism 3b (where the stroke length adjusting unit 3 operates as the fixed link mechanism 3b from the time when the pedal stroke $S_P$ is zero; specifically, where the second engagement pin 57 is engaged with the x-axis positive direction end portion of the second slotted hole 322 from when $S_P$ is zero). Broken lines in FIGS. 11, 13 and 14 indicate characteristics achieved by the rod portion 331 and the elastic member 6 being brought into contact with each other.

First, the following description will explain the characteristics, operation and advantages accomplished when the rod portion 331 and the elastic member 6 are not provided and therefore do not contact each other (boosting properties).

Figure 11:
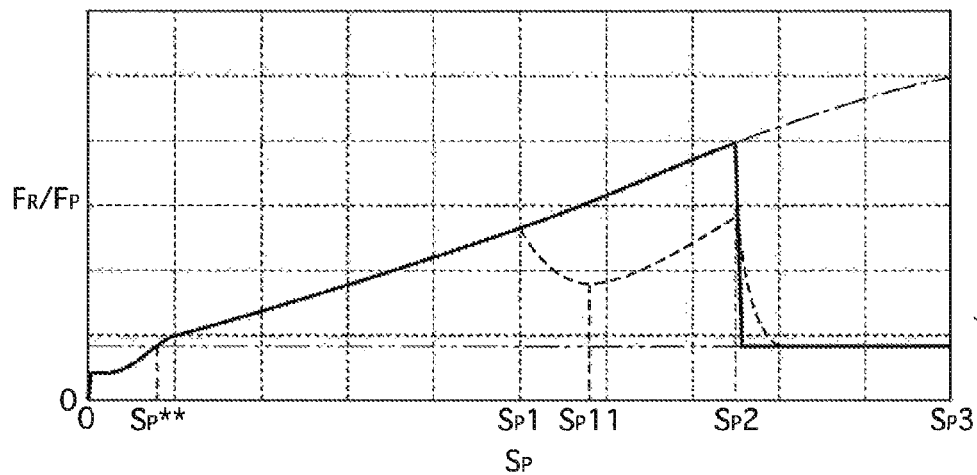
FIG. 11 is a property chart showing relationship between a ratio $F_R/F_P$ of rod thrust force $F_R$ to pedal effort $F_P$, and the pedal stroke $S_P$ according to Embodiment 1.

FIGS. 10 and 11 show boosting properties of the brake device. A curved line in FIG. 10 indicates characteristics of changes in the rod stroke $S_R$ relative to the pedal stroke $S_P$.

A curved line in FIG. 11 indicates characteristics of changes in the ratio $F_P$ $F_R/F_P$ (boosting or lever ratio) of the rod thrust force $F_R$ to the pedal effort relative to the pedal stroke $S_P$.

As shown in FIG. 10, when the pedal stroke $S_P$ is in a range from zero to $S_P2$, the stroke ratio $S_P/S_R$ is made variable by applying the variable link mechanism 3a. The links 31, 32 and 33 of the variable link mechanism 3a are adjusted in shape, length, pivot position, and the like so that the quantity of operation of the brake pedal 2, which is required for moving the pushrod 4 by the same amount, changes with desired characteristics according to length of the pedal stroke $S_P$. When $S_P$ is zero, $S_R$ is zero, too. $S_R$ increases from zero as $S_P$ increases from zero. A ratio $\Delta S_R/\Delta S_P$ of an amount of change $\Delta S_R$ in $S_R$ to an amount $\Delta S_P$ of unit change in $S_P$ is smaller in a late stage (where $S_P$ is large) of the pressing on the brake pedal than in an initial stage (where $S_P$ is small). For this reason, a curved line indicating the changes of $S_R$ relative to $S_P$ rises to the right and is upward convex. In the initial stage of the pressing on the brake pedal, $\Delta S_R/\Delta S_P$ is larger than when the fixed link mechanism 3b is applied, whereas in the late stage, $\Delta S_R/\Delta S_P$ is smaller than when the fixed link mechanism 3b is applied. When the pedal stroke $S_P$ is in a range from zero to $S_P*$, the rod stroke $S_R$ relative to the same pedal stroke $S_P$ is larger than when the fixed link mechanism 3b is applied. When the pedal stroke $S_P$ is equal to or larger than $S_P*$, the rod stroke $S_R$ relative to the same pedal stroke $S_P$ is smaller than when the fixed link mechanism 3b is applied. When the pedal stroke $S_P$ is equal to or larger than $S_P2$, the stroke ratio $S_P/S_R$ is fixed by applying the fixed link mechanism 3b. When the pedal stroke Sp changes from a value smaller than $S_P2$ to $S_P2$ or larger, $\Delta S_R/\Delta S_P$ takes the same value as when the stroke length adjusting unit 3 is applied, and $\Delta S_R/\Delta S_P$ is higher than when the pedal stroke $S_P$ is smaller than $S_P2$. In other words, since the variable link mechanism 3a is switched to the fixed link mechanism 3b, the amount of change $\Delta S_R$ in the rod stroke $S_R$ relative to the same amount of change $\Delta S_P$ in the pedal stroke $S_P$ increases and then remains constant. The x-axis directional motion amount (rod stroke $S_R$) from the initial position of the pushrod 4 is set to be smaller than the amount of pressing on the brake pedal 2, namely, the motion amount (pedal stroke $S_P$) from the initial position of the point of effort (pedal pad 21) of the brake pedal 2, with respect to each pedal stroke $S_P$ in all ranges where the brake pedal 2 can swing (all ranges of the pedal stroke $S_P$). Furthermore, the rod stroke $S_R$ is set to be smaller than the motion amount of the brake pedal 2 from the initial position of the points of load (pins 51 and 56) with respect to each pedal stroke $S_P$, in all the ranges of the pedal stroke $S_P$.

As described above, the stroke length adjusting unit 3 includes a first range and a second range. The first range lies between when the operation of the brake pedal 2 by the driver is initiated and before the operation quantity reaches the predetermined operation quantity $S_P2$. In the first range, $\Delta S_R/\Delta S_P$ is variable. The amount of change in the rod stroke $S_R$ (stroke length of the piston in the master cylinder) relative to the amount of change in the pedal stroke $S_P$ has variable ratio characteristics in the first range. In the second range, the operation quantity $S_P$ of the brake pedal 2 is equal to or larger than the predetermined operation quantity $S_P2$, and $\Delta S_R/\Delta S_P$ is fixed. In the second range, therefore, the amount of change in the rod stroke $S_R$ (stroke length of the piston in the master cylinder) relative to the amount of change in the pedal stroke $S_P$ has fixed ratio characteristics. The variable link mechanism 3a operates in the first range.

The fixed link mechanism 3b immediately takes over the operation of the variable link mechanism 3a in the second range.

As shown in FIG. 11, when the pedal stroke $S_P$ is in a range from zero to $S_P2$, the boost ratio $F_R/F_P$ is made variable by applying the variable link mechanism 3a. When the pedal stroke $S_P$ is zero, the boost ratio $F_R/F_P$ is a predetermined value larger than zero. As $S_P$ increases from zero, the boost ratio $F_R/F_P$ increases from the predetermined value. The curved line indicating the changes of the boost ratio $F_R/F_P$ relative to the pedal stroke $S_P$ rises to the right in a curve. In the initial stage of pressing on the brake pedal (where the pedal stroke $S_P$ is small), an amount of increase of $F_R/F_P$ relative to the amount $\Delta S_P$ of unit increase in the pedal stroke $S_P$ is small at the beginning, then increases in proportion to increase of $S_P$, and decreases again, showing characteristics with a curved line in a shape of letter S. In the initial stage of pressing on the brake pedal (where $S_P$ is smaller than $S_P$), $F_R/F_P$ is smaller than when the fixed link mechanism 3b is applied. In other time than the initial stage (that is, when $S_P$ is larger than $S_P$), $F_R/F_P$ is larger than when the fixed link mechanism 3b is applied. If the pedal stroke $S_P$ is $S_P2$ or larger, $F_R/F_P$ is fixed by applying the fixed link mechanism 3b. When the pedal stroke $S_P$ changes from a value smaller than $S_P2$ to $S_P2$ or larger, $F_R/F_P$ becomes the same as when the fixed link mechanism 3b is applied, and $F_R/F_P$ decreases lower than when the pedal stroke $S_P$ is smaller than $S_P2$. Since the variable link mechanism 3a is switched to the fixed link mechanism 3b, $F_R/F_P$ abruptly decreases and then remains constant.

Figure 12:
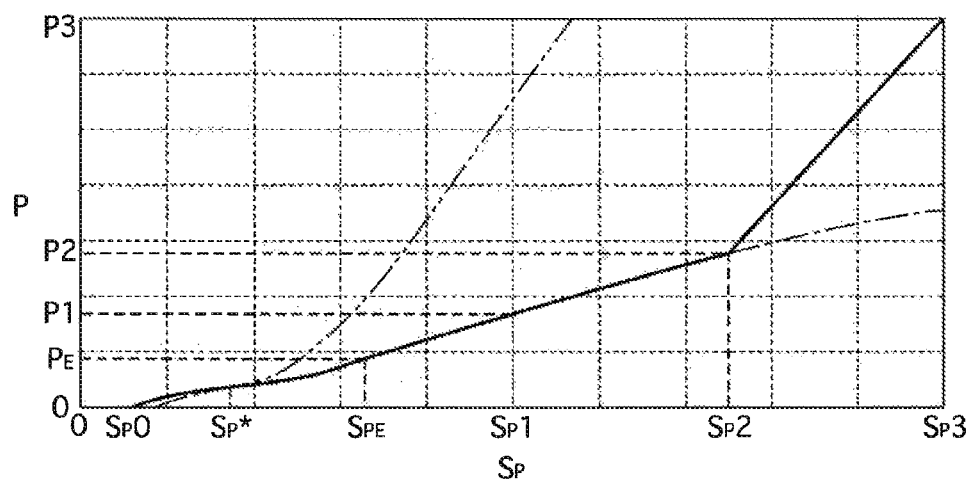
FIG. 12 is a property chart showing relationship between the pedal stroke $S_P$ and wheel-cylinder hydraulic pressure P according to Embodiment 1.
Figure 13:
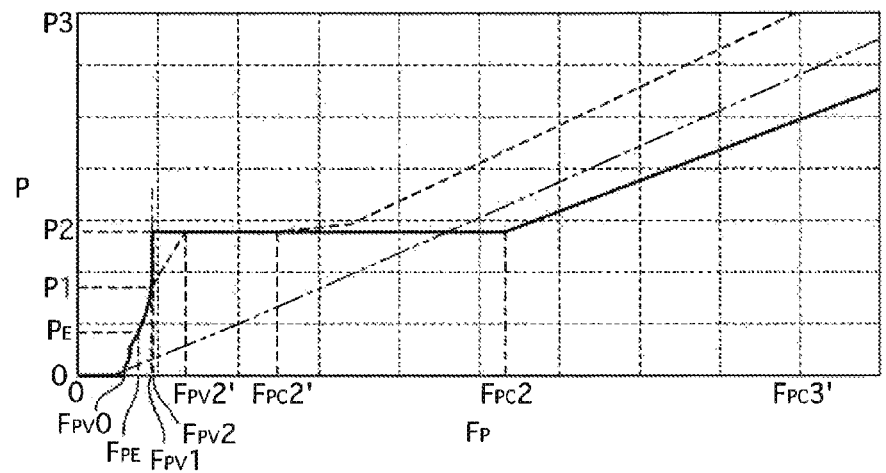
FIG. 13 is a property chart showing relationship between the pedal effort $F_P$ and the wheel-cylinder hydraulic pressure P according to Embodiment 1.
Figure 14:
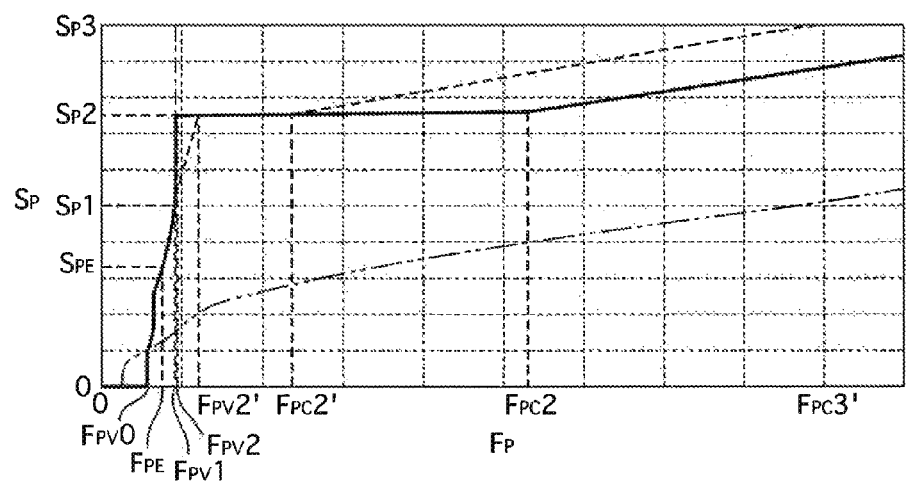
FIG. 14 is a property chart showing relationship between the pedal effort $F_P$ and the pedal stroke $S_P$ according to Embodiment 1.

FIGS. 12 to 14 show characteristics of relationship between the pedal stroke $S_P$, pedal effort $F_P$, and wheel-cylinder hydraulic pressure P (vehicle deceleration G) of the brake device. The curved line in FIG. 12 indicates S-P characteristics showing relationship between the pedal stroke $S_P$ and the wheel-cylinder hydraulic pressure P. The curved line in FIG. 13 indicates F-P characteristics showing relationship between the pedal effort $F_P$ and the wheel-cylinder hydraulic pressure P. The curved line in FIG. 14 indicates F-S characteristics showing relationship between the pedal effort $F_P$ and the pedal stroke $S_P$.

(S-P Characteristics)

If an amount of brake fluid supplied from the master cylinder toward the wheel cylinder is Q, the fluid amount Q increases generally in proportion to the increase of $S_R$. When the fluid amount Q increases from zero, the wheel-cylinder hydraulic pressure P increases after a backlash in the piston of the wheel cylinder (caliper) is eliminated. According to the present embodiment, relationship between the fluid amount Q and the hydraulic pressure P (hydraulic rigidity) has characteristics that a rate of increase of the hydraulic pressure P with respect to the increase of the fluid amount Q is low until the fluid amount Q reaches a predetermined amount, and that the rate of increase of the hydraulic pressure P with respect to the increase of the fluid amount Q rises when the fluid amount Q exceeds the predetermined amount. The increase of the pedal stroke $S_P$ therefore increases the rod stroke $S_R$ (increases the fluid amount Q) according to the characteristics shown in FIG. 10. As the result, The hydraulic pressure P accordingly increases as shown in FIG. 12. When the pedal stroke $S_P$ is smaller than $S_P2$, a ratio $\Delta P/\Delta S_P$ of the amount of change in the hydraulic pressure P to the amount of change in the pedal stroke $S_P$ is made variable by applying the variable link mechanism 3a (the amount of change in the hydraulic pressure P relative to the amount of change in the pedal stroke $S_P$ has the variable ratio characteristics). While the pedal stroke $S_P$ is in a range from zero to $S_P0$, the hydraulic chambers of the master cylinder are in communication with the reservoir through the holes formed in the pistons, so that the hydraulic pressure P does not increase and remains at zero. When the pedal stroke $S_P$ reaches $S_P0$ and then increases, the hydraulic pressure P also increases. When the pedal stroke $S_P$ is in a range from zero to $S_P{}^*$, the rod stroke $S_R$ relative to the same pedal stroke $S_P$ (namely, fluid amount Q) is set larger than when the fixed link mechanism 3b is applied. Accordingly, the hydraulic pressure P starts to increase at the pedal stroke $S_P$ ($S_P0$) smaller than that when the fixed link mechanism 3b is applied, and the hydraulic pressure P relative to the same pedal stroke $S_P$ is larger than when the fixed link mechanism 3b is applied. When the pedal stroke $S_P$ is $S_P{}^*$ or larger, the rod stroke $S_R$ relative to the same pedal stroke $S_P$ (namely, fluid amount Q) is set smaller than when the fixed link mechanism 3b is applied, so that the hydraulic pressure P relative to the same pedal stroke $S_P$ is accordingly smaller than when the fixed link mechanism 3b is applied. When the pedal stroke $S_P$ is $S_P2$ or larger, $\Delta P/\Delta S_P$ is fixed by applying the fixed link mechanism 3b (the amount of change in the hydraulic pressure P relative to that of the pedal stroke $S_P$ has the fixed ratio characteristics). When the pedal stroke $S_P$ changes from a value smaller than $S_P2$ to $S_P2$ or larger, $\Delta P/\Delta S_P$ becomes the same as when the fixed link mechanism 3b is applied, and increases more than when the pedal stroke $S_P$ is smaller than $S_P2$. In other words, the switching from the variable link mechanism 3a to the fixed link mechanism 3b increases the amount $\Delta S_R$ of change in the rod stroke $S_R$ (extension of the pushrod 4) relative to the amount $\Delta S_P$ of change in the same pedal stroke $S_P$. The amount $\Delta P$ of change in the hydraulic pressure P accordingly increases. As described above, the incremental gradient $\Delta P/\Delta S_P$ of the hydraulic pressure P during a time period between when the brake pedal operation by the driver is initiated and before the pedal stroke reaches a predetermined operation quantity $S_P2$ (first range) is smaller than the incremental gradient $\Delta P/\Delta S_P$ of the hydraulic pressure P when the operation quantity becomes the predetermined operation quantity $S_P2$ or larger (second range).

(F-P Characteristics)

As shown in FIG. 13, the variable link mechanism 3a is configured to operate according to the operation of the brake pedal 2 when the pedal effort $F_P$ is smaller than a predetermined value $F_{Pv}2$. When the pedal effort $F_P$ is smaller than a predetermined value $F_{Pv}2$, the ratio $\Delta P/\Delta F_P$ of the amount of change in the hydraulic pressure P to that of the pedal effort $F_P$ is made variable by applying the variable link mechanism 3a (the amount of change in the hydraulic pressure P relative to that of the pedal effort $F_P$ has the variable ratio characteristics). The hydraulic pressure P is zero, regardless of changes in the pedal effort $F_P$ while the pedal effort $F_P$ is in a range from zero to $F_{Pv}0$. When the pedal effort $F_P$ becomes $F_{Pv}0$ or larger but smaller than $F_{Pv}2$, the hydraulic pressure P increases from zero along with the increase of the pedal effort $F_P$. A curved line indicating the change of the hydraulic pressure P relative to the pedal effort $F_P$ sharply rises to the right. When the pedal effort $F_P$ is $F_{Pv}0$ or larger but smaller than $F_P2$, $\Delta P/\Delta F_P$ is larger than when the fixed link mechanism 3b is applied. When the pedal effort $F_P$ is in a range between a value slightly larger than $F_{Pv}0$ and a value smaller than $F_P2$, the hydraulic pressure P relative to the same pedal effort $F_P$ is larger than when the fixed link mechanism 3b is applied. When the pedal effort $F_P$ is $F_{Pv}2$, the hydraulic pressure P becomes P2. When the pedal effort $F_P$ becomes $F_{Pv}2$ or larger, the fixed link mechanism 3b immediately takes over the operation of the variable link mechanism 3a. When the pedal effort $F_P$ is in a range from $F_{Pv}2$ to $F_{Pc}2$, $\Delta P/\Delta F_P$ is generally zero, and the hydraulic pressure P remains at P2, regardless of changes of the pedal effort $F_P$. When the pedal effort $F_P$ is $F_{Pc}2$ or larger, $\Delta P/\Delta F_P$ is fixed by applying the fixed link mechanism 3b (the amount of change in the hydraulic pressure P relative to that of the pedal effort $F_P$ has the fixed ratio characteristics). When the pedal effort $F_P$ becomes $F_{Pc}2$ or larger, $\Delta P/\Delta F_P$ becomes the same as when the fixed link mechanism 3b is applied, and $\Delta P/\Delta F_P$ decreases more than when the pedal effort $F_P$ is smaller than $F_P2$. To be short, the incremental gradient $\Delta P/\Delta F_P$ of the hydraulic pressure P during a time period between when the operation of the brake pedal 2 by the driver is initiated and before the pedal effort $F_P$ reaches a predetermined pedal force $F_{Pv}2$ is larger than the incremental gradient $\Delta P/\Delta F_P$ of the hydraulic pressure P when the pedal effort $F_P$ is the predetermined value $F_{Pv}2$ or larger.

(F-S Characteristics)

As shown in FIG. 14, when the pedal effort $F_P$ is smaller than $F_{Pv}2$, the ratio $\Delta S_P/\Delta F_P$ of the amount of change in the pedal stroke $S_P$ to that of the pedal effort $F_P$ is made variable by applying the variable link mechanism 3a (the amount of change in the pedal stroke $S_P$ relative to that of the pedal effort $F_P$ has the variable ratio characteristics). When the pedal effort $F_P$ is in a range from zero to $F_{Pv}0$, the pedal stroke $S_P$ is zero, regardless of changes of the pedal effort $F_P$. When the pedal effort $F_P$ becomes $F_{Pv}0$ or larger, the pedal stroke $S_P$ increases from zero along with the increase of the pedal effort $F_P$. The curved line indicating the changes of the pedal stroke $S_P$ relative to the pedal effort $F_P$ sharply rises to the right. When the pedal effort $F_P$ is $F_{Pv}0$ or larger but smaller than $F_{Pv}2$, $\Delta S_P/\Delta F_P$ is larger than when the fixed link mechanism 3b is applied. When the pedal effort $F_P$ is in a range between a value slightly larger than $F_{Pv}0$ and a value smaller than $F_{Pv}2$, the pedal stroke $S_P$ relative to the same pedal effort $F_P$ is larger than when the fixed link mechanism 3b is applied. When the pedal effort $F_P$ is $F_{Pv}2$, the pedal stroke $S_P$ becomes $S_P2$. When the pedal effort $F_P$ is $F_{Pv}2$ or larger, the fixed link mechanism 3b immediately takes over the operation of the variable link mechanism 3a. When the pedal effort $F_P$ is in a range from $F_{Pv}2$ to $F_{Pc}2$, $\Delta S_P/\Delta F_P$ becomes generally zero, and the pedal stroke $S_P$ remains at $S_P2$, regardless of changes of the pedal effort $F_P$. When the pedal effort $F_P$ is $F_{Pc}2$ or larger, $\Delta S_P/\Delta F_P$ is fixed by applying the fixed link mechanism 3b (the amount of change in the pedal stroke $S_P$ relative to the amount of change in the pedal effort $F_P$ has the fixed ratio characteristics). When the pedal effort $F_P$ becomes $F_{Pc}2$ or larger, $\Delta S_P/\Delta F_P$ becomes the same as when the fixed link mechanism 3b is applied, and $\Delta S_P/\Delta F_P$ decreases more than when the pedal effort $F_P$ is smaller than $F_P2$. To be short, the incremental gradient $\Delta S_P/\Delta F_P$ of the pedal stroke $S_P$ during a time period between when the operation of the brake pedal 2 by the driver is initiated and before the pedal effort $F_P$ reaches a predetermined pedal effort $F_{Pv}2$ is larger than the incremental gradient $\Delta S_P/\Delta F_P$ of the pedal stroke Sp when the pedal effort $F_P$ is the predetermined value $F_{Pv}2$ or larger.

(Energy Saving, Downsizing, and Cost Reduction)

When regular braking which generates the hydraulic braking force according to the brake pedal operation by the driver (pedal effort braking) is applied, the brake device uses the stroke length adjusting unit 3 to generate an assisting force for reducing the brake pedal applying force applied by the driver. The stroke length adjusting unit 3 is a mechanical booster which adjusts the stroke length of the piston in the master cylinder, relative to the quantity of operation of the brake pedal 2 by the driver. The stroke length adjusting unit 3 mechanically boosts and assists the brake pedal applying force by using the brake pedal applying force applied by the driver, exclusively. The stroke length adjusting unit 3 is neither a booster which generates hydraulic pressure by means of an electric motor or an accumulator nor a booster which is driven by an energy source other than the brake pedal applying force applied by the driver, such as a mastervac using engine negative pressure, to generate an assisting force. The brake device according to the present embodiment therefore eliminates the need to activate a booster of a type which generates the assisting force by using an energy source other than the brake pedal applying force applied by the driver at the time of applying the regular braking. The brake device therefore saves consumption energy for generating the assisting force. Since the booster using the electric motor, engine negative pressure and the like can be omitted, it is possible to suppress the booster from growing in size.

In a reflection of a desire for fuel efficiency improvement in vehicles, there has been a need for brake devices whose boosters do not use engine negative pressure, or if they do use engine negative pressure, use low negative pressure. If a vehicle includes a booster which uses an electric motor or an accumulator to generate hydraulic pressure, a brake system is increased in size and complicated in structure, and the number of components is also increased, which makes the vehicle disadvantageous in terms of cost and deteriorates installability of the components in the vehicle. Furthermore, since the vehicle is increased in size and weight, there are possibilities that the energy efficiency of the vehicle is decreased. As described above, there has been a desire for brake systems which improve fuel efficiency, compact in size, and inexpensive. In this respect, since the brake device of the present embodiment includes the stroke length adjusting unit 3 using the link mechanisms 3a and 3b functioning as a booster, the brake device exerts a sufficient brake performance required at least in a regular range, and yet improves fuel efficiency. At the same time, the brake device of the present embodiment makes it possible to downsize the brake system and has a cost advantage.

It is conceivable to use the hydraulic control unit as an energy source for filling up a deficiency in the brake pedal applying force. For example, it is possible to achieve required brake hydraulic pressure by activating not only the stroke length adjusting unit 3 but also the hydraulic control unit in a predetermined brake-pedal operating range. On the other hand, if the hydraulic control unit is often activated (pump up), the advantage of saving consumption energy might be diminished. There are other possibilities that a pump is degraded in durability, and that the brake system is deteriorated in quietness (sound vibration performance). From this aspect, the present embodiment uses only the pedal effort braking (stroke length adjusting unit 3) at the time of regular braking, and does not use the hydraulic control unit. The present embodiment therefore makes it possible to avoid the foregoing problems and offers an advantage, such as a maximum improvement in energy efficiency. Since the brake device uses as a booster the stroke length adjusting unit 3 which is mechanical, it is possible to achieve a minimum required deceleration of the vehicle by using the brake pedal applying force applied by the driver in the event of failure of a power supply system. The brake device is therefore excellent also in fail safe.

(Operation of the Stroke Length Adjusting Unit)

The brake device of the present embodiment is suitable for compact vehicles and light vehicles (hereinafter, referred to as "compact vehicles and the like"). Since the compact vehicles and the like can be operated with small-volume wheel cylinders and a small-diameter (piston of) a master cylinder, these vehicles do not require a large force for boosting the brake pedal applying force applied by the driver (boost ratio). The compact vehicles and the like, because of small mass thereof, require only a small braking force for generating the same deceleration G. The applicant found, as a result of analysis, that the compact vehicles and the like can sufficiently accomplish pedal characteristics (S-F-G characteristics) identical to those of an existing brake device (comparative example) by using the stroke length adjusting unit 3 only, at least in the regular range. Items to which the brake device of the present embodiment can be applied are not limited to compact vehicles and the like. Specifically, the stroke length adjusting unit 3 is configured to adjust the x-axis directional motion amount of the pushrod 4 (rod stroke $S_R$) lower than the amount of pressing on the brake pedal 2 (pedal stroke $S_P$) in all operating ranges of the brake device. This makes the stroke ratio $S_P/S_R$, or the boost ratio, become larger than 1. Due to principle of leverage, therefore, the force applied to the brake pedal 2 (pedal effort $F_P$) is transmitted to the pushrod 4 after being amplified. The rod thrust force $F_R$ is larger than the pedal effort $F_P$ in all ranges of the pedal stroke $S_P$, so that it is possible to exert the boost function, amplify (boost) and transmit the pedal effort $F_P$ to the piston in the master cylinder, and thus obtain a high brake hydraulic pressure P.

To be more specific, the pedal effort $F_P$ is amplified according to the ratio (pedal ratio) of distance from the fulcrum (pedal rotating shaft 50) of the brake pedal 2 to the point of load (pins 51 and 56) and distance from the fulcrum (pedal rotating shaft 50) to the point of effort (pedal pad 21). In all the ranges of the pedal stroke $S_P$, the amount of x-axis directional motion of the pushrod 4 (from the initial condition), or the rod stroke $S_R$, is set smaller than the amount of motion of the fulcrum (pins 51 and 56) of the brake pedal 2 (from the initial condition). For this reason, in all the ranges of the pedal stroke $S_P$, the rod thrust force $F_R$ becomes larger than the pedal effort $F_P$ amplified according to the pedal ratio (the force entered from the brake pedal 2 through the pins 51 and 56 into the first link 31 and second intermediate link 34). For this reason, as compared to a case in which the stroke length adjusting unit 3 is not provided, a higher brake hydraulic pressure P can be obtained if the force applied to the brake pedal 2 is amplified (boosted) before being transmitted to the piston in the master cylinder.

There are various demands as to the pedal characteristics which indicate the relationship between the pedal stroke $S_P$, the pedal effort $F_P$, and the hydraulic pressure P (deceleration G). The demands can be fulfilled if the pedal characteristics of the brake device are adjusted by the stroke length adjusting unit 3. The present embodiment has fundamental ideas (demands or responses thereto) as below. (A) In the initial stage of the brake pedal operation, the brake fluid amount Q in large quantity is supplied to the wheel cylinders, to thereby improve response in increasing the braking force (hydraulic pressure P) with respect to the brake pedal operation. (B) In a brake-pedal operating range which is frequently used (regular range), the pedal characteristics are brought close to those of the brake device (comparative example) with the engine negative pressure booster (S-F-P characteristics), to thereby suppress a deterioration in brake pedal operation feeling (pedal feeling). (C) In a late stage of the brake pedal operation, a reaction force acting on the brake pedal 2 (pedal reaction force) is properly obtained, and at the same time, the braking force (hydraulic pressure P) is allowed to increase, to thereby suppress a deterioration in pedal feeling.

(A):

As shown in FIG. 10, when $0 \leq S_P \leq S_P2$ is true, due to the activation of the variable link mechanism 3a, the earlier the stage of stroke of the brake pedal 2 is, the greater the ratio $\Delta S_R/\Delta S_P$ is (the pushrod 4 is easy to stroke). For this reason, in the initial stage of the brake pedal operation, the brake fluid amount Q in large quantity can be supplied to the wheel cylinders by applying a relatively small pedal stroke $S_P$. This makes it possible to supply the wheel cylinders with the fluid amount Q required in a relatively early stage after the brake pedal starts to be pressed, and come out of a non-linear range early in which hydraulic rigidity is low (the rate of increase of the hydraulic pressure P relative to the fluid amount Q is small). It is then possible to improve the response in increasing the braking force (hydraulic pressure P) with respect to the brake pedal operation. As shown in FIG. 13, if $\Delta P/\Delta F_P$ in the early stage of the brake pedal operation is set large by the activation of the variable link mechanism 3a, it is possible to improve the response in increasing the braking force (hydraulic pressure P) with respect to the brake pedal operation (increase of the pedal effort $F_P$). Since $\Delta S_R$ relative to $\Delta S_P$ is small in the late stage of the stroke of the brake pedal 2, the braking force can be ensured without difficulty by increasing an amplification rate of the pedal effort $F_P$. It is therefore possible to achieve the minimum required deceleration of the vehicle by the brake pedal applying force applied by the driver even in the event of failure.

(B):

The brake-pedal operating range at the initial stage of the brake pedal operation, in which the deceleration G is relatively low, is a regular range which is relatively highly used (accounts for generally 80 percent of, for example, a predetermined total number of times when the brake is applied). The above-mentioned range has the following characteristics. Assuming that, for example, there is a demand to achieve characteristics that the hydraulic pressure is $P_E$ or higher, and the pedal effort is $F_{PE}$ or smaller when the pedal stroke is $S_{PE}$, link characteristics (boost characteristics) of the variable link mechanism 3a are adjusted so that a required fluid amount Q may be supplied from the master cylinder before the pedal stroke $S_P$ reaches $S_{PE}$. It is thus possible to bring the hydraulic pressure to $P_E$ or higher when the pedal stroke is $S_{PE}$ as shown in FIG. 12. The link characteristics of the variable link mechanism 3a may be adjusted so that the pedal effort is $F_{PE}$ or smaller when the hydraulic pressure is $P_E$ as shown in FIG. 13, and that the pedal effort is $F_{PE}$ or smaller when the pedal stroke is $S_{PE}$ as shown in FIG. 14. Regarding the F-S and F-P characteristics, the comparative example which activates the engine negative-pressure booster has, for example, such characteristics (jump-in characteristics) that, immediately after the brake pedal is pressed, neither the pedal stroke $S_P$ nor the hydraulic pressure P is generated when the pedal effort F is zero or smaller than a predetermined value Fj; and when the pedal effort $F_P$ becomes Fj or larger, the pedal stroke $S_P$ and the hydraulic pressure P are generated to increase up to respective predetermined amounts at once. The present embodiment adjusts the link characteristics of the variable link mechanism 3a, and thus acquires the pedal characteristics (S-F-P) which simulate the characteristics of the comparative example (jump-in characteristics) in the regular range as shown in FIGS. 13 and 14. The embodiment thus improves the pedal feeling.

(C):

If there is provided the variable link mechanism 3a only, and the demands (A) and (B) are satisfied by adjusting the link characteristics thereof, there is a possibility that preferable pedal characteristics cannot be exerted in all the ranges of the pedal stroke $S_P$. If an attempt is made to improve the installability of the brake device in the vehicle, the variable link mechanism 3a is limited in structure, shape, and location. These limits are significant especially when the brake device is installed in a compact vehicle or the like because a space in which the brake device can be installed is small (there is a limited legroom for the driver, which is used for installing the brake pedal 2 and the stroke length adjusting unit 3). If the structure (link characteristics) of the variable link mechanism 3a is so designed as to comply with the demands (A) and (B) under limiting conditions to follow at the time of installing the brake device in the vehicle, there is a possibility that the pedal feeling is deteriorated in the late stage of the brake pedal operation. For example, $\Delta S_R/\Delta S_P$ becomes too small in the late stage of stroke of the brake pedal 2, and only a small quantity of the fluid amount Q can be supplied even if the amount $\Delta S_P$ of unit change in the pedal stroke $S_P$ is the same. This might deteriorate the response in increasing the braking force (hydraulic pressure P) with respect to the brake pedal operation. That is to say, the variable link mechanism 3a with the foregoing structure has characteristics that the pedal stroke $S_P$ rapidly increases despite that the pedal effort $F_P$ does not change very much since the boost ratio becomes extremely large, as shown by the dot-and-dash line in FIG. 14. Also, as shown by the dot-and-dash line in FIG. 12, the variable link mechanism 3a with the foregoing structure has characteristics that the hydraulic pressure P is slow to increase despite that the pedal stroke $S_P$ is increased to a large degree. The variable link mechanism 3a with the foregoing structure further has characteristics that the hydraulic pressure P increases despite that the pedal effort $F_P$ does not change very much, as shown by the dot-and-dash line in FIG. 13. Consequently, there is a possibility that the brake device has characteristics that a proper pedal reaction force cannot be obtained, attributable to the pedal effort $F_P$ which is too small. If the variable link mechanism 3a is so designed as to establish characteristics that a proper pedal reaction force can be obtained, and yet the hydraulic pressure P can be increased, in the late stage of the brake pedal operation, the demands (A) and (B) might not be satisfied. If there is provided the variable link mechanism 3a only, this might produce the link characteristics that the pushrod 4 strokes in an opposite direction to the operating direction of the brake pedal 2 in the late stage of the brake pedal operation. In this case, the reverse motion of the pushrod 4 reduces the hydraulic pressure P (reduces the deceleration G) or hampers a smooth brake pedal operation, in spite of the pressing on the brake pedal 2.

In contrast, according to the present embodiment, the stroke length adjusting unit 3 is constructed by combining the variable link mechanism 3a and the fixed link mechanism 3b. The stroke length adjusting unit 3 thus includes the first range with the variable ratio characteristics and the second range with the fixed ratio characteristics. This makes it possible to satisfy the conflicting demands (A) to (C) in the initial and late stages of the brake pedal operation. Even if the variable link mechanism 3a has the link characteristics which allow the reverse motion of the pushrod 4 in the late stage of the brake pedal operation, the reverse motion of the pushrod 4 can be avoided by switching to the fixed link mechanism 3b. Such a combination of the variable ratio and the fixed ratio enables the pedal characteristics of the brake device to be adjusted without difficulty.

More specifically, the variable link mechanism $3a$ is switched to the fixed link mechanism $3b$ in the late stage of the stroke of the brake pedal $2$ ($S_P \geq S_P2$) as shown in FIG. 10, so that $\Delta S_R / \Delta S_P$ is suppressed from becoming too small. As compared to the case in which only the variable link mechanism $3a$ is provided, the amount $\Delta S_R$ of change in the rod stroke $S_R$ is large relative to the same amount $\Delta S_P$ of unit change in the pedal stroke $S_P$ in the late stage of the brake pedal operation. This makes it possible to supply a larger quantity of the fluid amount Q (generate higher hydraulic pressure P) even if the amount $\Delta S_P$ of unit change in the pedal stroke $S_P$ is the same. As shown in FIG. 12, $\Delta P / \Delta S_P$ in the second range ($S_P \geq S_P2$) is larger than that in the first range ($0 \leq S_P \leq S_P2$). It is then possible to improve response in increasing the braking force (hydraulic pressure P) with respect to the brake pedal operation (increase of the pedal stroke $S_P$), also in the late stage of the brake pedal operation. To be short, the boost ratio is suppressed from becoming too large. As shown in FIG. 14, $\Delta S_P / \Delta F_P$ in the second range ($S_P 2 \geq S_P 2$) is smaller than that in the first range ($0 \leq S_P \leq S_P 2$). In order that the pedal stroke $S_P$ becomes large in the second range ($S_P \geq S_P2$), $\Delta F_P$ larger than that in the first range ($0 \leq S_P \leq S_P2$) is required. As shown in FIG. 12, $\Delta P / \Delta S_P$ in the second range ($S_P \geq S_P2$) is larger than that in the first range ($0 \leq S_P \leq S_P2$). In the second range ($S_P \geq S_P2$), the amount $\Delta S_P$ of unit change in the pedal stroke $S_P$ which is required for the hydraulic pressure P to become large is smaller than that in the first range ($0 \leq S_P \leq S_P2$). Furthermore, as shown in FIG. 13, $\Delta P / \Delta S_P$ in the second range ($S_P \geq S_P2$) is smaller than that in the first range ($0 \leq S_P \leq S_P2$). This means that the second range ($S_P \geq S_P2$) requires larger $\Delta F_P$ than that in the first range ($0 \leq S_P \leq S_P2$) in order that the hydraulic pressure P becomes large. In other words, the amount $\Delta S_P$ of unit change in the pedal stroke $S_P$ which is required for the hydraulic pressure P to increase is suppressed from becoming too large, and at the same time, $\Delta S_P$ and $\Delta P$ are suppressed from becoming too large in relation to $\Delta F_P$, in the late stage of the brake pedal operation. It is therefore possible in the late stage of the brake pedal operation to increase the braking force (hydraulic pressure P) in relation to the brake pedal operation (increase of the pedal stroke $S_P$), and suppress the pedal effort $F_P$ from becoming too small, to thereby obtain a proper pedal reaction force. This makes it possible to suppress the deterioration of the pedal feeling. Particularly in the range with high deceleration G in the late stage of the brake pedal operation, people tend to control the deceleration G (hydraulic braking force) with the pedal effort $F_P$. Therefore, if the link characteristics are adjusted to bring the F-P characteristics among the above-mentioned characteristics close to the comparative example, the pedal feeling is improved.

Since the ratio characteristics of the stroke length adjusting unit $3$ are adjusted on the basis of the specifications of the vehicle and target characteristics of the pedal effort braking, the required pedal characteristics can be achieved. The installability of the brake device is improved since it is possible to achieve the pedal characteristics according to a type of the vehicle in which the brake device is installed, simply by modifying the design of the stroke length adjusting unit $3$ only. It is also possible to activate the fixed link mechanism $3b$ (include the fixed ratio characteristics) in the initial stage of the stroke ($0 \leq S_P \leq S_P2$), and then switch from the fixed link mechanism $3b$ to the variable link mechanism $3a$ to activate the variable link mechanism $3a$ (include the variable ratio characteristics) in the late stage of the stroke ($S_P \geq S_P2$). In this case, too, it is possible to satisfy the conflicting demands in the initial and late stages of the brake pedal operation, by adjusting the pedal characteristics of the brake device. The present embodiment activates the variable link mechanism $3a$ instead of the fixed link mechanism $3b$ in the initial stage of the stroke ($0 \leq S_P \leq S_P2$). It is therefore easier to achieve the characteristics which satisfy the demands (A) to (C). More specifically, in the initial stage of the brake pedal operation (in the first range), the demands (A) and (B) can be satisfied as mentioned above by activating the variable link mechanism $3a$. In the late stage of the brake pedal operation (in the second range), the demand (C) can be satisfied as mentioned above by activating the fixed link mechanism $3b$.

It is also possible to achieve the variable ratio characteristics by using another device (elastic member or the like), instead of using the variable link mechanism $3a$. Again, the conflicting demands in the initial and late stages of the brake pedal operation can be satisfied by adjusting the pedal characteristics of the brake device. The present embodiment achieves the variable ratio characteristics by using the variable link mechanism $3a$, which further facilitates the adjustment of the pedal characteristics. That is, the use of the link mechanisms facilitates the construction of the stroke length adjusting unit $3$ capable of adjusting the pedal characteristics, and simplifies the structure of the brake device. In addition, there is provided the fixed link mechanism $3b$ which immediately takes over the operation of the variable link mechanism $3a$. Consequently, the stroke length adjusting unit $3$ is simplified in structure, and the variable and fixed ratio characteristics can be quickly and easily switched with each other.

A specific structure of the brake pedal $2$ and that of the stroke length adjusting unit $3$ are not limited to those of the present embodiment. For example, according to the embodiment, the link mechanisms $3a$ and $3b$ include the first and second links $31$ and $32$ and the first and second intermediate links $33$ and $34$. However, the specific structure is not limited to this. In the present embodiment, the first and second slide portions are provided to the second link $32$ connected to the pushrod $4$; the first intermediate link $33$ (forming the variable link mechanism $3a$) is slidably engaged with the first slide portion; and the second intermediate link $34$ (forming the fixed link mechanism $3b$) is slidably engaged with the second slide portion. As the result, the link mechanisms $3a$ and $3b$ in which the variable and fixed ratio characteristics are switchable can be implemented with a small number of components and a simple structure. Specifically, at the initiation of the operation of the brake pedal $2$, the other end of the first intermediate link $33$ is engaged with the end portion of the first slide portion, and the other end of the second intermediate link $34$ is engaged with the second slide portion with allowance. For this reason, in the initial stage of the brake pedal operation after the operation of the brake pedal $2$ is initiated, the variable link mechanism $3a$ can be activated by engaging the other end of the first intermediate link $33$ and the end portion of the first slide portion, and the fixed link mechanism $3b$ can be inactivated by engaging with allowance the other end of the second intermediate link $34$ and the second slide portion. In the late stage of the brake pedal operation, the variable link mechanism $3a$ is inactivated by engaging with allowance the other end of the first intermediate link $33$ and the first slide portion, and the fixed link mechanism $3b$ can be activated by engaging the other end of the second intermediate link $34$ and the end portion of the second slide portion.

More specifically, the first and second slide portions are the slotted holes 321 and 322 formed along the longitudinal direction of the second link 32. It is thus possible to form, with a simple structure, the slide portions which enable the engagement to be made with and without allowance. Either one of the slide portions may be an element other than the slotted hole. In this case, too, the structure related to the slide portions can be simplified if at least either one of the first and second slide portions is the slotted hole. The first and second intermediate links 33 and 34 include the engagement pins 54 and 57 to be engaged with the slotted holes 321 and 322. This makes it possible to accomplish the engagement with and without allowance with a simple structure. The other ends of the intermediate links 33 and 34 and the slotted holes 321 and 322 may be engaged with each other by other device than the engagement pins 54 and 57. Again, as long as at least either one of the other ends of the first and second intermediate links 33 and 34 includes the engagement pin, an engagement device used for engaging the intermediate link 33 or the like can be simplified in structure. According to the embodiment, the second link 32 is divided into the first link portion 32a and the second link portion 32b, and these link portions include the first and second slide portions (slotted holes 321 and 322), respectively. If the first and second link portions 32a and 32b are disposed in parallel with each other, the slide portions (slotted holes 321 and 322) can be disposed to overlap with each other as viewed in the horizontal direction. When the slide portions (slotted holes 321 and 322) are formed in the second link 32, therefore, it is possible to suppress the increase of an axial (x-axis directional) dimension of the second link 32. This makes it possible to suppress the increase of the x-axial directional dimension of the stroke length adjusting unit 3, which downsizes the brake device and improves the installability of the brake device in the vehicle.

The rubber films 323 and 324 functioning as shock-absorbing members are disposed at the end portions of the slotted holes 321 and 322 of the second link 32. The films 323 and 324 absorb and moderate an impact caused by the engagement (contact) between the engagement pins 54 and 57 functioning as engagement members and the slotted holes 321 and 322. This suppresses noises generated when the engagement pins 54 and 57 come into contact with the end portions of the slotted holes 321 and 322 after sliding with respect to the slotted holes 321 and 322. In particular, if the second link 32 (inner peripheries of the slotted holes 321 and 322) and the engagement pins 54 and 57 are made of metal material, the noise generation can be effectively suppressed by avoiding a direct contact between the above-mentioned members. When the engagement pins 54 and 57 come into contact with the end portions of the slotted holes 321 and 322 after sliding with respect to the slotted holes 321 and 322, the films 323 and 324 are elastically deformed and thus absorb a minute backlash and axis misalignment. This facilitates the activation of the stroke length adjusting unit 3 formed of the link mechanisms 3a and 3b. Instead of the rubber films, an absorbing member which exerts the above functions may be formed of a spring or the like. The absorbing member is not particularly limited in material, shape, etc. The absorbing member may be provided only to the one end (x-axis positive direction side end, for example) between the end portions of the slotted holes 321 and 322. If the film 323 is provided to the x-axis positive direction end of the first slotted hole 321, the above advantage can be obtained when the fixed link mechanism 3b is switched to the variable link mechanism 3a. If the film 324 is provided to the x-axis positive direction end of the second slotted hole 322, the above advantage can be obtained when the variable link mechanism 3a is switched to the fixed link mechanism 3b. Since the present embodiment provides the absorbing members to both the end portions of the slotted holes 321 and 322, the effect of suppressing the noise generation and the like can be obtained even at the time of sudden braking (abrupt return of the brake pedal 2 or the like). Either one of the absorbing members in the slotted holes 321 and 322 may be omitted. The absorbing members may be disposed in either the slotted holes 321 and 322 or the engagement pins 54 and 57.

(Operation of the Elastic Member)

The following descriptions explain characteristics, operation, and advantages accomplished by the contact between the rod portion 331 and the elastic member 6. When the pedal stroke $S_P$ becomes $S_P1$ or larger but smaller than $S_P3$, the rod portion 331 is in contact with the elastic member 6. When the pedal stroke $S_P$ is $S_P1$ or larger but smaller than $S_P2$, the rod portion 331 compressively deforms the elastic member 6 and receives a reaction force from the elastic member 6 at the same time (see an arrow in FIG. 7. Shown by arrow is a component obtained by resolving the reaction force in a direction perpendicular to the axis of the rod portion 331.). At this time, the reaction force acts on the brake pedal 2 through the first link 31 from the rod portion 331 (first intermediate link 33) by an amount of compressive deformation of the elastic member 6. This results in increase of the pedal reaction force, and creates a need for an additional pedal effort $F_P$ for increasing the pedal stroke $S_P$. This means that the effective pedal effort $F_P$ (which is actually used to increase the pedal force $S_P$) decreases (decays) contrary to appearance. The elastic member 6 serves as a damper as described. As shown by the broken line in FIG. 14, when the pedal stroke $S_P$ is $S_P1$ or larger but smaller than $S_P2$, $\Delta F_P$ required for increasing the pedal stroke $S_P$ increases, as compared to the case (shown by the solid line) in which the rod portion 331 and the elastic member 6 (hereinafter, collectively referred to simply as "elastic member 6") are not provided. Values indicated by the broken line (extending from $F_{P_v}1$ to $F_{P_v}2'$) are larger than those by the solid line (extending from $F_{P_v}1$ to $F_{P_v}2$) in relation to the same pedal stroke $S_P$. As shown in FIG. 12, values from $S_P1$ to $S_P2$ correspond to those from P1 to P2. As the result, as shown by the broken line in FIG. 13, when the hydraulic pressure P is P1 or larger but smaller than P2, $\Delta F_P$ required for increasing the hydraulic pressure P increases, as compared to the case (shown by the solid line) in which the elastic member 6 is not provided. Values indicated by the broken line (extending from $F_{P_v}1$ to $F_{P_v}2'$) are larger than those by the solid line (extending from $F_{P_v}1$ to $F_{P_v}2$) in relation to the same hydraulic pressure P. When the pedal stroke $S_P$ is $S_P1$ or larger but smaller than $S_P2$, $\Delta F_P$ required for increasing the pedal stroke $S_P$ increases as described above. For this reason, in relation to the same pedal stroke $S_P$, an apparent ratio $F_R/F_P$ decreases, as compared to the case (shown by the solid line) in which the elastic member 6 is not provided, as shown by the broken line in FIG. 11. However, when the pedal stroke $S_P$ is $S_P1$ or larger but smaller than $S_P2$, $F_R/F_P$ (variable lever ratio) obtained by the variable link mechanism 3a is still larger than $F_R/F_P$ (fixed lever ratio) obtained by the fixed link mechanism 3b. An amount of decrease of $F_R/F_P$, which is obtained by providing the elastic member 6, is smaller than an amount of increase of $F_R/F_P$ obtained by the variable link mechanism 3a, which is compared to $F_R/F_P$ obtained by the fixed link mechanism 3b. Consequently, when the pedal stroke $S_P$ is $S_P1$ or larger but smaller than $S_{P2}$, $F_R/F_P$ (broken line) obtained by the stroke length adjusting unit 3 in the case where the elastic member 6 is provided is larger than $F_R/F_P$ (double-dot-and-dash line) obtained only by the fixed link mechanism 3b. Even with the elastic member 6, the required pedal effort $F_P$ decreases, as compared to the case where only the fixed link mechanism 3b is provided. Specifically, as the pedal stroke $S_P$ increases, $F_R/F_P$ decreases while the decrease amount of the pedal effort $F_P$ obtained by the variable link mechanism 3a is smaller than the increase amount of the pedal effort $F_P$ obtained by the compressive deformation of the elastic member 6 ($S_P1$ to $S_P11$), but $F_R/F_P$ increases while the decrease amount of the pedal effort $F_P$ obtained by the variable link mechanism 3a is larger than the increase amount of the pedal effort $F_P$ obtained by the compressive deformation of the elastic member 6 ($S_P11$ to $S_P2$).

When the pedal stroke $S_P$ is $S_P2$ or larger but smaller than $S_P3$, the second intermediate link 34 receives a reaction force from the elastic member 6 which is compressively deformed. The reaction force is transmitted from the rod portion 331 (first intermediate link 33) and acts on the pushrod 4 through the second intermediate link 34 (retainer portion 341) by the amount of the compressive deformation of the elastic member 6. This eliminates the necessity for the pedal effort $F_P$ for increasing the rod stroke $S_R$ (pedal stroke $S_P$) by an amount corresponding to the amount of the compressive deformation. In other words, the pedal reaction force decreases, and the effective pedal effort $F_P$ (which is actually used to increase the pedal stroke $S_P$) increases contrary to appearance. As shown by the broken line in FIG. 14, when the pedal stroke $S_P$ is $S_P2$ or larger but smaller than $S_P3$, the pedal effort $F_P$ required for increasing the pedal stroke $S_P$ decreases, as compared to the case (shown by the solid line) in which the elastic member 6 is not provided. Specifically, values indicated by the broken line (extending from $F_{Pc}2'$ to $F_{Pc}3'$) are smaller than those by the solid line (extending from $F_{Pc}2$) in relation to the same pedal stroke $S_P$. After the variable link mechanism 3a is switched to the fixed link mechanism 3b, the brake pedal 2 does not stroke until the pedal effort at $F_{Pc}2$ is applied if the elastic member 6 is not provided (according to the characteristics shown by the solid line). If the elastic member 6 is provided (according to the characteristics shown by the broken line), however, the brake pedal 2 starts to stroke once the pedal effort $F_P$ is applied, which is smaller than $F_{Pc}2$ and equal to or larger than $F_{Pc}2'$. As shown in FIG. 12, values from $S_P2$ to $S_P3$ correspond to those from P2 to P3. As shown by the broken line in FIG. 13, when the hydraulic pressure P is P2 or larger but smaller than P3, the pedal effort $F_P$ required for increasing the hydraulic pressure P decreases, as compared to the case (shown by the solid line) in which the elastic member 6 is not provided. Values indicated by the broken line (extending from $F_{Pc}2'$ to $F_{Pc}3'$) are smaller than those by the solid line (extending from $F_{Pc}2$) in relation to the same hydraulic pressure P. After the variable link mechanism 3a is switched to the fixed link mechanism 3b, the hydraulic pressure P does not increase until the pedal effort at $F_{Pc}2$ (required for the brake pedal 2 to start to stroke) is applied if the elastic member 6 is not provided (according to the characteristics shown by the solid line). If the elastic member 6 is provided (according to the characteristics shown by the broken line), however, the hydraulic pressure P starts to increase when the pedal effort $F_P$ is applied, which is smaller than $F_{Pc}2$ but equal to or larger than $F_{Pc}2'$ (required for the brake pedal 2 to start to stroke). As shown by the broken line in FIG. 11, when the pedal stroke $S_P$ is $S_P2$ or larger but smaller than $S_P3$, the pedal effort $F_P$ required for increasing the pedal stroke $S_P$ decreases by the amount of compressive deformation of the elastic member 6. As the result, the apparent ratio $F_R/F_P$ increases, as compared to the case (shown by the solid line) in which the elastic member 6 is not provided. If the elastic member 6 is not provided (according to the characteristics shown by the solid line), $F_R/F_P$ decreases at once, in the vicinity of $S_P2$, from a value obtained by the variable link mechanism 3a (a large value which is not reduced by the elastic member 6) to a value obtained by the fixed link mechanism 3b. In contrast, if the elastic member 6 is provided (according to the characteristics shown by the broken line), $F_R/F_P$ decreases, in the vicinity of $S_P2$, from a value obtained by the variable link mechanism 3a (a relatively small value reduced by the elastic member 6) so as to gradually approach a value obtained by the fixed link mechanism 3b.

When the pedal stroke $S_P$ is $S_P3$ or larger, the rod portion 331 does not contact the elastic member 6, so that the pushrod 4 does not receive the reaction force from the elastic member 6. As the result, all the characteristics completely conform to those of the fixed link mechanism 3b.

As described above, the first intermediate link 33 located on the variable link mechanism 3a side and the second intermediate link 34 located on the fixed link mechanism 3b side contact each other with the elastic member 6 intervening therebetween in the vicinity of $S_P2$ (range from $S_P1$ to $S_P3$).

The reaction force of the elastic member 6 is therefore transmitted to the brake pedal 2 and the pushrod 4, and the pedal effort F is accordingly suppressed from fluctuating rapidly at the time of switching the link mechanisms 3a and 3b. Since the elastic member 6 generates a damper effect in this way, parameter fluctuations in the characteristics concerning the pedal effort $F_P$ and $F_R/F_P$ are reduced. It is therefore possible, for example, to bring the characteristics close to the comparative example without difficulty. The pedal feeling therefore can be further improved at the adjustment of the pedal characteristics of the brake device by combining the variable ratio (variable link mechanism 3a) and the fixed ratio (fixed link mechanism 3b). The elastic member 6 serves as a brake pedal applying force adjusting unit which adjusts the pedal effort $F_P$ according to the link characteristics of the stroke length adjusting unit 3 (so as to complement the link characteristics). The characteristics concerning the pedal effort $F_P$ and $F_R/F_P$ can be arbitrarily set by changing the characteristics of the elastic member 6 as appropriate. The elastic member 6 may be attached to either the variable link mechanism 3a side (first intermediate link 33) or the fixed link mechanism 3b side (second intermediate link 34). The member to which the elastic member 6 is attached (or a counterpart member with and from which the elastic member 6 comes into contact and separate away) is not limited to the first and second intermediate link 33 and 34. The elastic member 6 is not limited to the rubber columnar member. The elastic member 6 may be a coil spring or the like, and may be an extension spring, instead of a compression spring. The elastic member 6 also may be formed in any shape. It is possible to provide more than one elastic member 6, and arrange a plurality of elastic members 6 in parallel or series. The elastic member 6, the rod portion 331, and the retainer portion 341 are not particularly limited in concrete structure, location, etc.

[Advantages]

Advantages produced by the brake device of the Embodiment 1 are listed below.

(1) The brake device includes the stroke length adjusting unit 3 configured to adjust the rod stroke $S_R$ (stroke length of the piston in the master cylinder) relative to the pedal stroke $S_P$ (the quantity of operation of the brake pedal 2 by the driver). The stroke length adjusting unit 3 includes the first range in which $\Delta S_R/\Delta S_P$ (amount of change in the stroke length of the piston in the master cylinder relative to the amount of change in the quantity of operation of the brake pedal 2) has the variable ratio characteristics during the time period between when the brake pedal operation by the driver is initiated and before the operation quantity reaches a predetermined operation quantity $S_P2$; and the second range in which $\Delta S_R/\Delta S_P$ has the fixed ratio characteristics when the quantity of operation of the brake pedal 2 is equal to or larger than the predetermined operation quantity $S_P2$.

The stroke length adjusting unit 3 thus improves the energy efficiency. The combination of variable and fixed ratio characteristics facilitates the adjustment of the pedal characteristics.

(2) The stroke length adjusting unit 3 includes the variable link mechanism 3a configured to operate in the first range, and the fixed link mechanism 3b configured to immediately take over the operation of the variable link mechanism 3a in the second range.

The pedal characteristics therefore can be easily adjusted by the link mechanisms.

(3) The stroke length adjusting unit 3 includes the link mechanisms 3a and 3b. The brake pedal 2 is supported pivotally relative to the bracket 1. The link mechanisms 3a and 3b include the first link 31 with one end pivotally connected to the brake pedal 2; the second link 32 with one end connected to the pushrod 4 of the master cylinder, the second link 32 having the first slotted hole 321 (first slide portion) formed along the axial direction in the other end side, and the second slotted hole 322 (second slide portion) formed along the axial direction in a portion between the first slotted hole 321 and the one end; the first intermediate link 33 with one end pivotally connected to the other end of the first link 31, the other end engaged with the first slotted hole 321 of the second link 32, and a portion between both the ends, which is pivotally supported by the bracket 1; and the second intermediate link 34 with one end pivotally connected to the brake pedal 2, and the other end engaged with the second slotted hole 322 of the second link 32.

It is therefore possible to implement the link mechanisms 3a and 3b with a simple structure.

(4) At the time of initiation of operation of the brake pedal 2, the other end of the first intermediate link 33 is engaged with the first slotted hole 321 (first slide portion), and the other end of the second intermediate link 34 is engaged with the second slotted hole 322 (second slide portion) with allowance.

It is then possible to activate the variable link mechanism 3a and bring the fixed link mechanism 3b into an inactive condition in the initial stage of the brake pedal operation.

(5) At least one of the first and second slide portions is either one of the slotted holes 321 and 322 formed along the longitudinal direction of the second link 32.

The slide portions therefore can be formed with a simple structure.

(6) The first intermediate link 33 includes the first engagement pin 54 engaged with the slotted hole 321.

This makes it possible to make the engagements with and without allowance with a simple structure.

(7) The second intermediate link 34 includes the second engagement pin 57 engaged with the slotted hole 322.

This makes it possible to make the engagements with and without allowance with a simple structure.

(8) The brake device includes the stroke length adjusting unit 3 configured to adjust the rod stroke $S_R$ (stroke length of the piston in the master cylinder) relative to the pedal stroke $S_P$ (the quantity of operation of the brake pedal 2 by the driver). The stroke length adjusting unit 3 is configured so that the increase gradient $\Delta P/\Delta F_P$ of the wheel-cylinder hydraulic pressure P relative to the pedal effort $F_P$ during the time period between when the brake pedal operation by the driver is initiated and before the pedal effort reaches the predetermined pedal force $F_{Pv}2$ is larger than the increase gradient $\Delta P/\Delta F_P$ when the pedal effort is $F_{Pv}2$ or larger.

The stroke length adjusting unit 3 improves the energy efficiency. It is possible to exert preferable pedal characteristics in all the ranges of the brake pedal operation. For example, even in the late stage of the brake pedal operation, it is possible to obtain a proper pedal reaction force and increase the braking force (hydraulic pressure P) relative to the brake pedal operation (increase of the pedal stroke $S_P$).

(9) The wheel-cylinder hydraulic pressure P is provided so that $\Delta P/\Delta F_P$ (amount of change in the wheel-cylinder hydraulic pressure P relative to the amount of change in the pedal effort $F_P$) has the variable ratio characteristics when the pedal effort is smaller than the predetermined value $F_{Pv}2$, and has the fixed ratio characteristics when the pedal effort is equal to or larger than the predetermined value $F_{Pv}2$.

The combination of the variable and fixed ratio characteristics enables the pedal characteristics to be adjusted without difficulty.

(10) The stroke length adjusting unit 3 includes the variable link mechanism 3a configured to operate according to the operation of the brake pedal 2 when the pedal effort is smaller than the predetermined pedal force $F_{Pv}2$, and the fixed link mechanism 3b configured to immediately take over the operation of the variable link mechanism 3a when the pedal effort is $F_{Pv}2$ or larger.

The link mechanisms thus make it possible to adjust the pedal characteristics without difficulty.

(11) The brake device includes the stroke length adjusting unit 3 configured to adjust the rod stroke $S_R$ (stroke length of the piston in the master cylinder) relative to the pedal stroke $S_P$ (the quantity of operation of the brake pedal 2 by the driver). The stroke length adjusting unit 3 is configured so that the increase gradient $\Delta P/\Delta S_P$ of the wheel-cylinder hydraulic pressure P relative to the operation quantity $S_P$ during the time period between when the brake pedal operation by the driver is initiated and before the operation quantity $S_P$ reaches the predetermined operation quantity $S_P2$ is smaller than the increase gradient $\Delta P/\Delta S_P$ when the the operation quantity $S_P$ is $S_P2$ or larger.

The stroke length adjusting unit 3 thus improves the energy efficiency. It is possible to exert preferable pedal characteristics in all the ranges of the brake pedal operation. For example, even in the late stage of the brake pedal operation, it is possible to obtain a proper pedal reaction force and increase the braking force (hydraulic pressure P) relative to the brake pedal operation (increase of the pedal stroke $S_P$).

(12) The wheel-cylinder hydraulic pressure P is provided so that $\Delta P/\Delta S_P$ (amount of change in the wheel-cylinder hydraulic pressure P relative to the amount of change in the operation quantity $S_P$) has the variable ratio characteristics when the operation quantity $S_P$ is smaller than the predetermined operation quantity $S_P2$, and $\Delta P/\Delta S_P$ has the fixed ratio characteristics when the operation quantity $S_P$ is equal to or larger than the predetermined operation quantity $S_P2$.

The combination of the variable and fixed ratio characteristics makes it possible to adjust the pedal characteristics without difficulty.

[Other Embodiments]

Aspects for carrying out the present invention have been described on the basis of the embodiment. The specific constitution of the invention is not limited to the embodiment illustrated above, and may be modified or improved in various ways without departing from the gist of the invention. It is therefore intended that any embodiments added with such modification or improvement are included in the technical scope of the invention.

The embodiment of the invention may be configured as described below.

(1) A brake device includes a stroke length adjusting unit configured to adjust a stroke length of a piston in a master cylinder relative to a quantity of brake pedal operation by a driver. The stroke length adjusting unit includes a first range in which an amount of change in the stroke length of the piston in the master cylinder relative to an amount of change in the brake pedal operation quantity has variable ratio characteristics during a time period between when the brake pedal operation by the driver is initiated and before the operation quantity reaches a predetermined value; and a second range in which the amount of change in the stroke length of the piston in the master cylinder relative to the amount of change in the brake pedal operation quantity has fixed ratio characteristics when the operation quantity is equal to or larger than the predetermined value.

(2) In the brake device according to (1), the stroke length adjusting unit includes a variable link mechanism configured to operate in the first range and a fixed link mechanism configured to immediately take over the operation of the variable link mechanism in the second range.

(3) In the brake device according to (1), the stroke length adjusting unit includes a link mechanism. The brake pedal is pivotally supported by the bracket. The link mechanism includes: a first link with one end pivotally connected to the brake pedal; a second link with one end connected to a pushrod of the master cylinder, including a first slide portion formed along an axial direction on the other end side, and a second slide portion formed along the axial direction in a portion between the first slide portion and the one end side; a first intermediate link with one end pivotally connected to the other end of the first link, the other end engaged with the first slide portion of the second link, and a portion between both ends pivotally supported by the bracket; and a second intermediate link with one end pivotally connected to the brake pedal, and the other end engaged with the second slide portion of the second link.

(4) In the brake device according to (3), at the time of initiation of brake pedal operation, the other end of the first intermediate link is engaged with the first slide portion, and the other end of the second intermediate link is engaged with the second slide portion with allowance.

(5) In the brake device according to (3), at least one of the first and second slide portions is a slotted hole formed along a longitudinal direction of the second link.

(6) In the brake device according to (5), the first intermediate link includes the first engagement pin engaged with the slotted hole.

(7) The brake device according to (6) includes a first shock-absorbing member disposed in at least one end of the slotted hole, and configured to come into contact with the first engagement pin.

(8) In the brake device according to (5), the second intermediate link includes a second engagement pin engaged with the slotted hole.

(9) The brake device according to (7) includes a second shock-absorbing member disposed in least one end of the slotted hole, and configured to come into contact with the second engagement pin.

(10) In the brake device according to (3), the first and second intermediate links contact each other with the elastic member intervening therebetween when the operation quantity is in the vicinity of the predetermined value.

(11) A brake device includes a stroke length adjusting unit configured to adjust a stroke length of a piston in a master cylinder relative to a quantity of brake pedal operation by a driver. The stroke length adjusting unit is configured so that an increase gradient of wheel-cylinder hydraulic pressure relative to pedal effort during a time period between when the brake pedal operation by the driver is initiated and before the pedal effort reaches a predetermined value is larger than an increase gradient of the wheel-cylinder hydraulic pressure relative to the pedal effort equal to or larger than the predetermined value.

(12) In the brake device according to (11), the wheel-cylinder hydraulic pressure is provided so that an amount of change in the wheel-cylinder hydraulic pressure relative to an amount of change in the pedal effort has variable ratio characteristics when the pedal effort is smaller than the predetermined value, and has fixed ratio characteristics when the pedal effort is equal to or larger than the predetermined value.

(13) In the brake device according to (11), the stroke length adjusting unit includes a variable link mechanism configured to operate according to brake pedal operation when the pedal effort is smaller than the predetermined value, and a fixed link mechanism configured to immediately take over the operation of the variable link mechanism when the pedal effort is equal to or larger than the predetermined value.

(14) In the brake device according to (11), the stroke length adjusting unit includes a link mechanism. The link mechanism includes a first link with one end pivotally connected to the brake pedal; a second link with one end connected to a pushrod of the master cylinder, including a first slide portion formed along an axial direction on the other end side, and a second slide portion formed along the axial direction in a portion between the first slide portion and the one end side; a first intermediate link with one end pivotally connected to the other end of the first link, the other end engaged with the first slide portion of the second link, and a portion between both the ends pivotally supported by a bracket; and a second intermediate link with one end pivotally connected to the brake pedal, and the other end engaged with the second slide portion of the second link.

(15) In the brake device according to (14), at the time of initiation of brake pedal operation, the other end of the first intermediate link is engaged with the first slide portion, and the other end of the second intermediate link is engaged with the second slide portion with allowance.

(16) In the brake device according to (15), the first and second slide portions are slotted holes formed along a longitudinal direction of the second link.

(17) In the brake device according to (14), the first and second intermediate links contact each other with an elastic member intervening therebetween when the operation quantity is in the vicinity of the predetermined value.

(18) A brake device includes a stroke length adjusting unit configured to adjust a stroke length of a piston in a master cylinder relative to a quantity of brake pedal operation by a driver. the stroke length adjusting unit is configured so that an increase gradient of a wheel-cylinder hydraulic pressure relative to the operation quantity during a time period between when the brake pedal operation by the driver is initiated and before the operation quantity reaches a predetermined value is smaller than an increase gradient of the wheel-cylinder hydraulic pressure relative to the operation quantity equal to or larger than the predetermined value.

(19) In the brake device according to (18), the wheel-cylinder hydraulic pressure is provided so that an amount of change in the wheel-cylinder hydraulic pressure relative to an amount of change in the operation quantity has variable ratio characteristics when the operation quantity is smaller than a predetermined value, and has fixed ratio characteristics when the operation quantity is equal to or larger than the predetermined value.

(20) In the brake device according to (18), the stroke length adjusting unit includes a link mechanism. The link mechanism includes a first link with one end pivotally connected to the brake pedal; a second link with one end connected to a pushrod of the master cylinder, including a first slotted hole formed along an axial direction on the other end side, and a second slotted hole formed along the axial direction in a portion between the first slotted hole and the one end side; a first intermediate link with one end pivotally connected to the other end of the first link, the other end engaged with the first slotted hole of the second link, and a portion between both ends pivotally supported by a bracket; and a second intermediate link with one end pivotally connected to the brake pedal, and the other end engaged with the second slotted hole of the second link. At the time of initiation of brake pedal operation, the other end of the first intermediate link is engaged with the first slotted hole, and the other end of the second intermediate link is engaged with the second slotted hole with allowance.

The present application claims priority based on Japanese Patent Application No. 2013-193871 filed on Sep. 19, 2013. The entire disclosure of Japanese Patent Application No. 2013-193871 filed on Sep. 19, 2013, including the description, claims, drawings and abstract, is incorporated herein by reference in its entirety.

REFERENCE SIGNS LIST 1 bracket
2 brake pedal
3 stroke length adjusting unit
3a variable link mechanism
3b fixed link mechanism
31 first link
32 second link
321 first slotted hole (first slide portion)
322 second slotted hole (second slide portion)
33 first intermediate link
34 second intermediate link
4 pushrod

The invention claimed is:
1. A brake device comprising:
a brake pedal;
a master cylinder including a piston configured to stroke according to a quantity of brake pedal operation by a driver; and
a stroke length adjusting unit configured to adjust a stroke length of the piston in the master cylinder, wherein the stroke length adjusting unit includes:
a first range in which an amount of change in the stroke length of the piston in the master cylinder relative to an amount of change in brake pedal operation quantity has variable ratio characteristics during a time period between when the brake pedal operation by the driver is initiated and before the operation quantity reaches a predetermined value; and
a second range in which the amount of change in the stroke length of the piston in the master cylinder relative to the amount of change in the brake pedal operation quantity has fixed ratio characteristics when the operation quantity is equal to or larger than the predetermined value, the ratio remaining fixed during the entire second range, and
the stroke length adjusting unit includes a variable link mechanism configured to operate in the first range, and a fixed link mechanism configured to immediately take over the operation of the variable link mechanism in the second range.

2. The brake device of claim 1, wherein
the stroke length adjusting unit includes a link mechanism,
the brake pedal is pivotally supported by a bracket; and
the link mechanism includes:
a first link with one end pivotally connected to the brake pedal;
a second link with one end connected to a pushrod of the master cylinder, the second link including a first slide portion formed along an axial direction on the other end side, and a second slide portion formed along the axial direction in a portion between the first slide portion and the one end side;
a first intermediate link with one end pivotally connected to the other end of the first link, the other end engaged with the first slide portion of the second link, and a portion between both the ends, which is pivotally supported by the bracket; and
a second intermediate link with one end pivotally connected to the brake pedal, and the other end engaged with the second slide portion of the second link.

3. The brake device of claim 2, wherein
at the time of initiation of brake pedal operation, the other end of the first intermediate link is engaged with the first slide portion, and the other end of the second intermediate link is engaged with the second slide portion with allowance.

4. The brake device of claim 2, wherein
at least one of the first and second slide portions is a slotted hole formed along a longitudinal direction of the second link.

5. The brake device of claim 4, wherein
the first intermediate link includes a first engagement pin engaged with the slotted hole.

6. The brake device of claim 5,
further including a first shock-absorbing member disposed in at least one end of the slotted hole, and configured to come into contact with the first engagement pin.

7. The brake device of claim 4, wherein
the second intermediate link includes a second engagement pin engaged with the slotted hole.

8. The brake device of claim 6,
further including a second shock-absorbing member disposed in at least one end of the slotted hole, and configured to come into contact with the second engagement pin.

9. The brake device of claim 2, wherein
the first and second intermediate links contact each other with an elastic member intervening therebetween when the operation quantity is between a first value smaller than the predetermined value and a second value larger than the predetermined value.

10. A brake device comprising:
a brake pedal;
a master cylinder including a piston configured to stroke according to a quantity of brake pedal operation by a driver; and
a stroke length adjusting unit configured to adjust a stroke length of the piston in the master cylinder, wherein
the stroke length adjusting unit is configured so that an increase gradient of a wheel-cylinder hydraulic pressure relative to pedal effort during a time period between when the brake pedal operation by the driver is initiated and before the pedal effort reaches a predetermined value is larger than an increase gradient of the wheel-cylinder hydraulic pressure relative to the pedal effort equal to or larger than the predetermined value,
the stroke length adjusting unit includes a link mechanism, and
the link mechanism includes:
a first link with one end pivotally connected to the brake pedal;
a second link with one end connected to a pushrod of the master cylinder, the second link including a first slide portion formed along an axial direction on the other end side, and a second slide portion formed along the axial direction in a portion between the first slide portion and the one end side;
a first intermediate link with one end pivotally connected to the other end of the first link, the other end enaged with the first slide portion of the second link, and a portion between both end portions, which is pivotally supported by a bracket; and
a second intermediate link with one end pivotally connected to the brake pedal, and the other end engaged with the second slide portion of the second link.

11. The brake device of claim 10, wherein
the wheel-cylinder hydraulic pressure is provided so that an amount of change in the wheel-cylinder hydraulic pressure relative to an amount of change in the pedal effort has variable ratio characteristics when the pedal effort is smaller than the predetermined value, and has fixed ratio characteristics when the pedal effort is equal to or larger than the predetermined value.

12. The brake device of claim 10, wherein
the stroke length adjusting unit includes a variable link mechanism configured to operate according to the brake pedal operation when the pedal effort is smaller than the predetermined value, and a fixed link mechanism configured to immediately take over the operation of the variable link mechanism when the pedal effort is equal to or larger than the predetermined value.

13. The brake device of claim 10, wherein
at the initiation of brake pedal operation, the other end of the first intermediate link is engaged with the first slide portion, and the other end of the second intermediate link is engaged with the second slide portion with allowance.

14. The brake device of claim 13, wherein
the first and second slide portions are slotted holes formed along a longitudinal direction of the second link.

15. The brake device of claim 10, wherein
the first and second intermediate links contact each other with an elastic member intervening therebetween when the operation quantity is between a first value smaller than the predetermined value and a second value larger than the predetermined value.

16. A brake device comprising:
a brake pedal;
a master cylinder including a piston configured to stroke according to a quantity of brake pedal operation by a driver; and
a stroke length adjusting unit including a link mechanism and configured to adjust a stroke length of a piston in a master cylinder, wherein
the stroke length adjusting unit is configured so that an increase gradient of a wheel-cylinder hydraulic pressure relative to an operation quantity during a time period between when the brake pedal operation by the driver is initiated and before the operation quantity reaches a predetermined value is smaller than an increase gradient of the wheel-cylinder hydraulic pressure relative to the operation quantity equal to or larger than the predetermined value,
the link mechanism includes:
a first link with one end pivotally connected to the brake pedal;
a second link with one end connected to a pushrod of the master cylinder, the second link including a first slotted hole formed along an axial direction on the other end side, and a second slotted hole formed along the axial direction in a portion between the first slotted hole and the one end side;
a first intermediate link with one end pivotally connected to the other end of the first link, the other end engaged with the first slotted hole of the second link, and a portion between both the ends, which is pivotally supported by a bracket; and
a second intermediate link with one end pivotally connected to the brake pedal, and the other end engaged with the second slotted hole of the second link, and
at the initiation of brake pedal operation, the other end of the first intermediate link is engaged with the first slotted hole, and the other end of the second intermediate link is engaged with the second slotted hole with allowance.

17. The brake device of claim 16, wherein
the wheel-cylinder hydraulic pressure is provided so that an amount of change in the wheel-cylinder hydraulic pressure relative to an amount of change in the operation quantity has variable ratio characteristics when the operation quantity is smaller than a predetermined value, and has fixed ratio characteristics when the operation quantity is equal to or larger than the predetermined value.

* * * * *